US012676867B2

(12) United States Patent
Hunt et al.

(10) Patent No.: US 12,676,867 B2
(45) Date of Patent: Jul. 7, 2026

(54) SECURE CLASSICAL OPTICAL COMMUNICATION USING QUANTUM TECHNIQUES

(71) Applicants: The Boeing Company, Chicago, IL (US); The Chancellor, Masters and Scholars of the University of Cambridge of the Old Schools, Cambridge (GB)

(72) Inventors: Jeffrey H. Hunt, Thousand Oaks, CA (US); Yupeng Gong, Cambridge (GB); Richard Vincent Penty, Cambridge (GB); Ian White, Cambridge (GB); Adrian Wonfor, Cambridge (GB)

(73) Assignees: THE BOEING COMPANY, Arlington, VA (US); THE CHANCELLOR, MASTERS AND SCHOLARS OF THE UNIVERSITY OF CAMBRIDGE OF THE OLD SCHOOLS, Cambridge (GB)

( * ) Notice: Subject to any disclaimer, the term of this patent is extended or adjusted under 35 U.S.C. 154(b) by 169 days.

(21) Appl. No.: 17/923,809

(22) PCT Filed: May 4, 2021

(86) PCT No.: PCT/US2021/030648
§ 371 (c)(1),
(2) Date: Nov. 7, 2022

(87) PCT Pub. No.: WO2022/015395
PCT Pub. Date: Jan. 20, 2022

(65) Prior Publication Data
US 2023/0188544 A1     Jun. 15, 2023

Related U.S. Application Data

(60) Provisional application No. 63/022,088, filed on May 8, 2020.

(51) Int. Cl.
| | |
|---|---|
| *H04L 9/40* | (2022.01) |
| *H04B 10/70* | (2013.01) |
| *H04L 9/08* | (2006.01) |

(52) U.S. Cl.
CPC ........ *H04L 63/1416* (2013.01); *H04L 9/0852* (2013.01); *H04B 10/70* (2013.01)

(58) Field of Classification Search
CPC .... H04L 63/1416; H04L 9/0852; H04B 10/70
See application file for complete search history.

(56) References Cited

U.S. PATENT DOCUMENTS

| | | | |
|---|---|---|---|
| 2007/0133798 A1 | 6/2007 | Elliott | |
| 2007/0165233 A1* | 7/2007 | Freeling ................ | B82Y 10/00 356/497 |

(Continued)

FOREIGN PATENT DOCUMENTS

| | | |
|---|---|---|
| CN | 106788706 A | 5/2017 |
| WO | 2017/004207 A1 | 1/2017 |
| WO | 2019/106381 A1 | 6/2019 |

OTHER PUBLICATIONS

Su et al., "Kalman filter-based phase estimation of continuous-variable quantum key distribution without sending local oscillator" 2019, Science Direct. "https://www.sciencedirect.com/science/article/pii/S0375960119303949" (Year: 2019).*

(Continued)

*Primary Examiner* — Dhairya A Patel
*Assistant Examiner* — Eui H Kim
(74) *Attorney, Agent, or Firm* — MH2 Technology Law Group LLP

(57) ABSTRACT
Systems for, and methods of, detecting an attack on an optical communication channel are presented. The techniques can include sending, from a sender to a receiver, and over the optical communication channel, an optical signal, where the optical signal includes a classical optical signal (Continued)

representing first information and a quantum optical signal representing second information. The techniques can include detecting, by the receiver, third information from at least a portion of the quantum optical signal and sending, by the receiver to the sender, the third information. The techniques can include determining, by the sender, an indication of an attack on the optical communication channel based on at least a portion of the second information and the third information. The techniques can include triggering an alarm based on the determining.

22 Claims, 19 Drawing Sheets

(56) References Cited

U.S. PATENT DOCUMENTS

| | | | |
|---|---|---|---|
| 2014/0082730 A1* | 3/2014 | Vashist | H04L 63/1416 |
| | | | 726/23 |
| 2014/0186033 A1 | 7/2014 | Winzer et al. | |
| 2014/0341575 A1 | 11/2014 | Choi et al. | |
| 2016/0337032 A1 | 11/2016 | Johnson et al. | |
| 2017/0093503 A1* | 3/2017 | Winzer | H04B 10/60 |
| 2017/0331623 A1* | 11/2017 | Fu | H04L 9/0852 |
| 2020/0389299 A1* | 12/2020 | White | H04B 10/85 |

OTHER PUBLICATIONS

PCT International Preliminary Report on Patentability issued Nov. 8, 2022 in corresponding PCT Application No. PCT/UW2021030648, 5 pages.

International Search Report and Written Opinion issued Jan. 31, 2019 in related PCT Application No. PCT/GB2018/053476 filed Nov. 30, 2018, 10 pages.

Grosshans et al., Quantum Key Distribution Using Gaussian-Modulated Coherent States, Nature (London) 421, 238-241 (Jan. 2003), 8 pages.

Kikuchi et al., "Fundamentals of Coherent Optical Fiber Communications," Journal of Lighwave Technology, vol. 34, No. 1, Jan. 2016, 157-178.

Qi, Simultaneous Classical Communication and Quantum Key Distribution Using Continuous Variable, arXiv:1606.02664v2[quant-ph] Aug. 2016, 7 pages.

Notification of transmittal of the International Search Report and the Written Opinion of the International Searching Authority, or the Declaration issued Feb. 1, 2022 in corresponding PCT Application No. PCT/US2021/030648 filed May 4, 2021, 7 pages.

Extended European Search Report and Written Opinion issued May 2, 2024 in corresponding EP Application No. 21841871.3, 6 pages.

Brunner et al., A low-complexity heterodyne CV-QKD architecture, 2017 19th International Conference on Transparent Optical Networks (ICTON), IEEE, Jul. 2, 2017, pp. 1-4.

Datta, "Quantum cryptography BB84 quantum key distribution," Mar. 27, 2020, Section BB84 Quantum Key Distribution Protocol., 8 pages.

Gong, Y., et al., "Experimental demonstration of confidential communication with quantum security monitoring," Scientific Reports, 2021, 16 pages.

First Office Action as issued for CN Application No. 202180047763. X, dated Jan. 29, 2026, 9 pages.

* cited by examiner

SECURE CLASSICAL OPTICAL COMMUNICATION USING QUANTUM TECHNIQUES

RELATED APPLICATION

This application claims priority to, and the benefit of, U.S. Provisional Patent Application No. 63/022,088 entitled, "Secure Quantum Optical Communication", and filed May 8, 2020, which is hereby incorporated by reference in its entirety.

FIELD

This disclosure relates to secure optical communication, e.g., detecting attacks on an optical communications channel such as a fiber optics line.

BACKGROUND

Optical communication uses light to transmit information, e.g., over a fiber optics line. Security has become increasingly important for optical communication infrastructure. Attacks are increasingly common, such that fiber optics lines should be constantly monitored. However, classical optical communication physical layer security relies on active optical fiber monitoring techniques, which are generally based on power monitoring and active diagnostics of the network, e.g., by measuring the optical mean power of the optical signal in a communication line. However, such classical methods have vulnerabilities and security loopholes in practice. For example, existing techniques do not protect from intercept-resend attacks. As another example, a sophisticated tapping attack may reduce the transmission by less than 1%, which may not be detected by existing classical techniques.

Quantum optical communication techniques have been used to detect informational intruders in instances where classical detection cannot. However, such techniques are generally limited to distributing encryption keys in quantum optical signals. Such techniques are not available for detecting attacks on classical optical communication channels that encode information in classical optical signals. Further, quantum key distribution systems are expensive to implement and for most applications are "over-kill." Moreover, such techniques have been largely limited to demonstrations in a laboratory environment. Existing quantum optical communication techniques are generally not practical for implementation in the real world.

SUMMARY

This disclosure provides examples according to the following clauses.

Clause 1: A method of detecting an attack on an optical communication channel, the method comprising: sending, from a sender to a receiver, and over the optical communication channel, an optical signal, wherein the optical signal comprises a classical optical signal representing first information and a quantum optical signal representing second information; detecting, by the receiver, third information from at least a portion of the quantum optical signal; sending, by the receiver to the sender, the third information; determining, by the sender, an indication of an attack on the optical communication channel based on at least a portion of the second information and the third information; and triggering an alarm based on the determining.

Clause 2: The method of Clause 1, wherein the indication of the attack comprises at least one of a loss of transmission or an increase of noise.

Clause 3: The method of any of Clauses 1 or 2, wherein the indication of the attack comprises a loss of transmission of less than 1% of an unattacked transmission.

Clause 4: The method of any of Clauses 1-3, wherein the indication of the attack comprises an increase of noise of at least 0.5 shot noise units.

Clause 5: The method of any of Clauses 1-4, wherein the sending, by the receiver to the sender, the third information comprises sending a classical optical signal over the optical communication channel.

Clause 6: The method of any of Clauses 1-5, wherein the classical optical signal is interleaved with the quantum optical signal.

Clause 7: The method of any of Clauses 1-6, wherein the attack comprises at least one of a tapping attack, a jamming attack, a correlated jamming attack, or an interrupt-resend attack.

Clause 8: The method of any of Clauses 1-7, wherein the optical communication channel comprises a distance of at least 50 km, and wherein the method has a sensitivity of less than or equal to 0.04 dB.

Clause 9: The method of any of Clauses 1-8, wherein the detecting comprises measuring using homodyne detection.

Clause 10: The method of any of Clauses 1-9, wherein the detecting comprises measuring using heterodyne detection.

Clause 11: A system for detecting an attack on an optical communication channel, the system comprising: a sender operable to send to a receiver over the optical communication channel an optical signal comprising a classical optical signal representing first information and a quantum optical signal representing second information; a receiver operable to detect third information from at least a portion of the quantum optical signal; wherein the receiver is operable to send to the sender the third information; and wherein the sender is operable to determine an indication of an attack on the optical communication channel based on at least a portion of the second information and the third information and trigger an alarm that indicates the attack.

Clause 12: The system of Clause 11, wherein the indication of the attack comprises at least one of a loss of transmission or an increase of noise.

Clause 13: The system of any of Clauses 11 or 12, wherein the indication of the attack comprises a loss of transmission of less than 1% of an unattacked transmission.

Clause 14: The system of any of Clauses 11-13, wherein the indication of the attack comprises an increase of noise of at least of 0.5 shot noise units.

Clause 15: The system of any of Clauses 11-14, wherein the receiver is operable to send to the sender the third information to the sender as a classical optical signal over the optical communication channel.

Clause 16: The system of any of Clauses 11-15, wherein the classical optical signal is interleaved with the quantum optical signal.

Clause 17: The system of any of Clauses 11-16, wherein the attack comprises at least one of a tapping attack, a jamming attack, a correlated jamming attack, or an interrupt-resend attack.

Clause 18: The system of any of Clauses 11-17, wherein the optical communication channel comprises a distance of at least 50 km, and wherein the sender is operable to determine the indication of the attack on the optical communication channel with a sensitivity of less than or equal to 0.04 dB.

Clause 19: The system of any of Clauses 11-18, wherein the receiver is operable to detect third information from at least a portion of the quantum optical signal using homodyne detection.

Clause 20: The system of any of Clauses 11-19, wherein the receiver is operable to detect third information from at least a portion of the quantum optical signal using heterodyne detection.

BRIEF DESCRIPTION OF THE DRAWINGS

The accompanying drawings, which are incorporated in and constitute a part of this specification, illustrate the present teachings and together with the description, serve to explain the principles of the disclosure.

Figure 1:
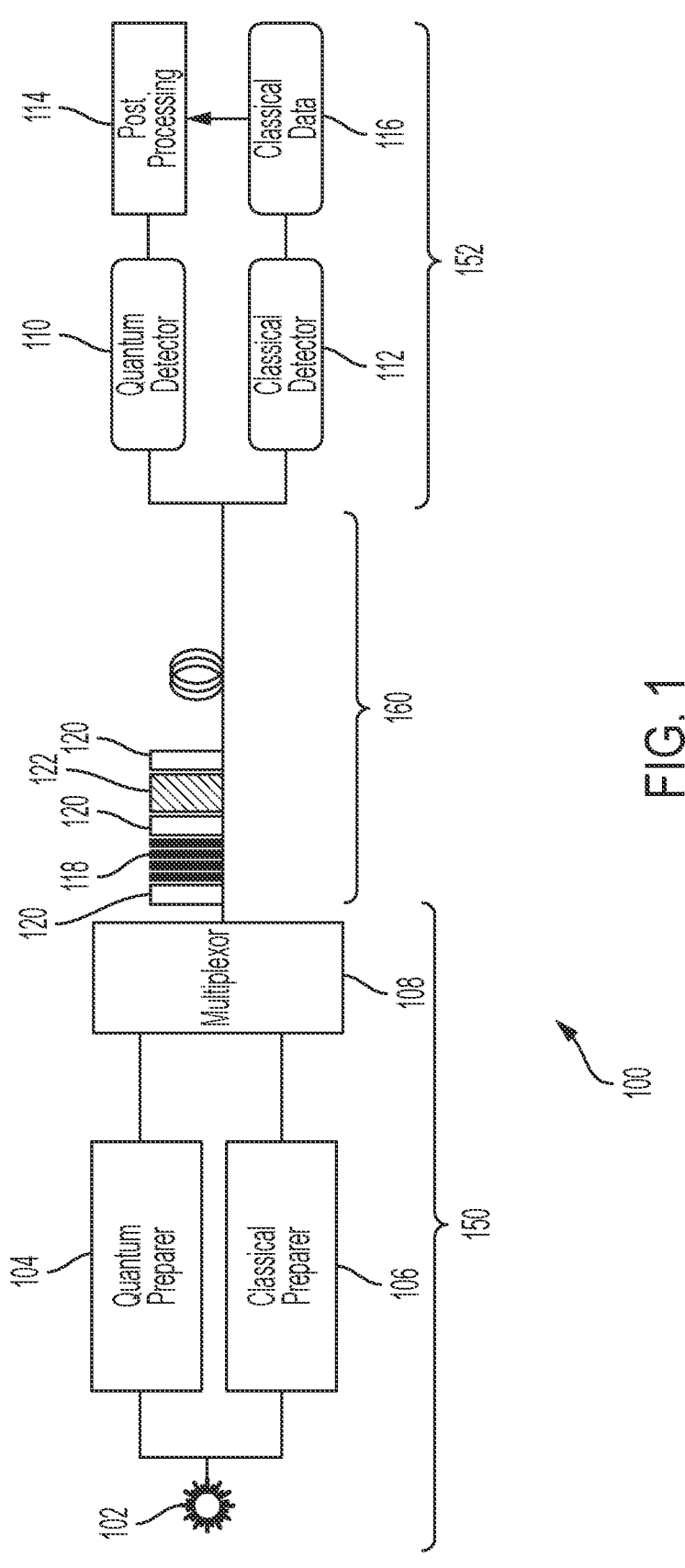
FIG. 1 is a high-level schematic diagram of a system for detecting an attack on an optical communication channel that uses quantum optical preparation and classical optical preparation in parallel, according to various examples.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples can be utilized and that changes can be made without departing from the scope of the disclosure. The following description is, therefore, merely exemplary.

I. INTRODUCTION

Some examples provide for detecting attacks on classical optical communication channels, such as in fiber optics communication networks, using quantum optical techniques. According to some examples, quantum technologies are used to monitor the flow of information and detect the presence of an attacker on a classical optical communication channel, such as on an internet communication line.

Some examples can be implemented by using existing communications hardware, e.g., existing fiber optics lines. Because some examples do not employ quantum communication for encryption or to convey information intended to be sent over the communication channel, such examples are easy and inexpensive to implement, particularly as compared to quantum optical encryption techniques.

Some examples utilize quantum optical signals, sent on the same communication channel as classical optical signals, to detect attacks. According to various examples, the quantum optical signals may be interleaved with, overlap, appear simultaneously, or appear in alternation with the classical optical signals. The quantum optical signals and the classical optical signals may be in any of a variety of forms, and may use any of a variety of classical and quantum optical modulation techniques. For example, the quantum optical signals may be modulated using a different technique from that used to modulate the classical optical communication signals.

Some examples detect attacks on a classical optical communication channel by detecting a loss of correlation of a quantum optical signal sent in the same channel. The loss of correlation may be in any of a variety of forms. For example, the loss of correlation may be in the form of excess noise in the received quantum optical signal. The loss of correlation may be in the form of a loss of bit values of the received quantum optical signal. The loss of correlation may be in the form of a loss of transmission of the received quantum optical signal. The loss of correlation may be in the form of an excess mean difference between modulation state values in the received quantum optical signal. The loss of correlation may be in the form of any combination of the aforementioned forms of losses of correlation. These and other forms of loss of correlation may indicate an attack on a classical optical communication signal present in the same communication channel as the quantum optical signal for which a loss of correlation is detected, according to various examples.

Some examples are capable of detecting a variety of attacks, such as, by way of non-limiting examples, tapping attacks, jamming attacks, correlated jamming attacks, and interrupt-resend attacks on classical optical communication channels. Brief descriptions of example attacks are presented immediately below.

A tapping attack occurs when an attacker intercepts an amount of signal that is transmitted in a communication channel, e.g., in an optical fiber communication channel. Typically, the amount of intercepted signal is extremely small. For example, the intercepted signal of an optical fiber tapping attack may constitute less than 1% of the power of the signal. The attacker may analyze the intercepted signal to determine data transmitted in the communication channel without the sender or receiver being aware.

A jamming attack occurs when an attacker introduces a signal into a communication channel, e.g., an optical fiber communication channel. The introduced signal may be in the form of optical noise, for example. The introduced signal may degrade the service quality or prevent communication entirely. For example, the introduction of noise may reduce or completely block data transmitted in the communication channel. The introduced signal may be in-band or out-of-band relative to the signal that is intended to be transmitted in the communication channel.

A correlated jamming attack occurs when an attacker intercepts a small amount of signal in a communication channel such as an optical fiber communication channel, e.g., as in a tapping attack, but also adds in a different signal in the communication channel. As in a jamming attack, the introduced signal may be in the form of optical noise and may degrade or eliminate communications entirely. In a correlated jamming attack, the overall amplitude of the signal in the communication channel may remain unchanged. Therefore, in a correlated jamming attack, simple detection of signal amplitude may not provide an indication of the presence of an attack. Further, a correlated jamming attack in a classical optical fiber communication channel may appear as if the communication channel were simply excessively noisy, such that detection of the attack may be thwarted.

An interrupt-resend attack occurs when an attacker intercepts some amount of signal that is transmitted in a communication channel, such as an optical fiber communication channel, and then re-transmits the some or all of the original signal into the communication channel. Thus, an interrupt-resend attack may combine a tapping attack with retransmission, such that that the signal in the communication channel appears unchanged. In an optical communication channel, the overall amplitude of, and information in, the signal may be completely unchanged by an interrupt-resend attack. In a classical optical fiber communications channel, interrupt-resend attacks can be virtually undetectable.

II. OVERVIEW

Figure 3:
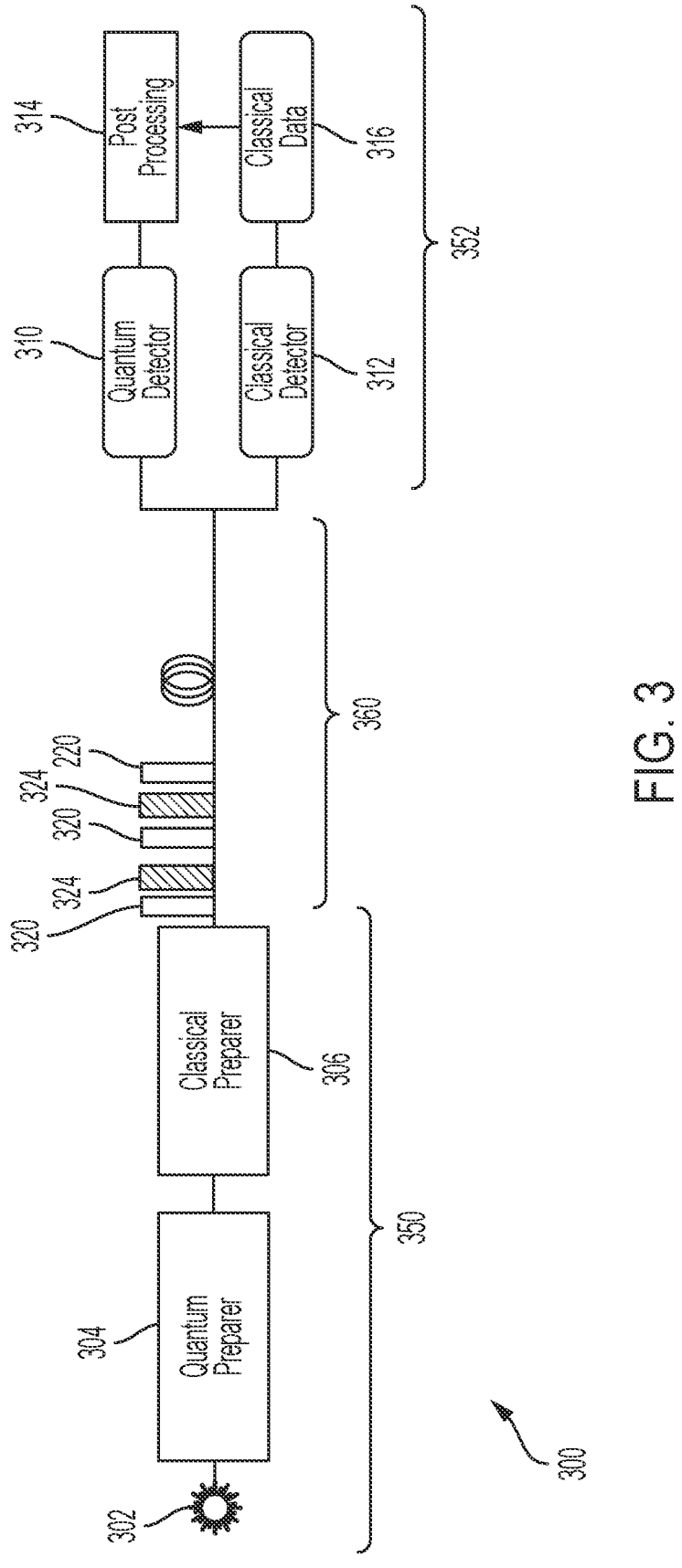
FIG. 3 is a high-level schematic diagram of a system for detecting an attack on an optical communication channel that uses quantum optical preparation and classical optical preparation in series, according to various examples.

This section provides high-level descriptions of examples, particularly in reference to FIGS. 1 and 3. Additional sections herein disclose implementation details for the examples disclosed in this section. For example, this section discloses quantum preparers, classical preparers, quantum detectors, classical detectors, and multiplexors, which may be implemented as disclosed in this section and detailed in subsequent sections.

FIG. 1 is a high-level schematic diagram of a system 100 for detecting an attack on an optical communication channel 160 that uses quantum optical preparation and classical optical preparation in parallel, according to various examples. As shown in FIG. 1, sender 150 sends a communication to receiver 152 over communication channel 160, which may be attacked by an attacker. A corresponding system may be included and used to send messages from receiver 152 to sender 150 over communication channel 160 or over a different communication channel. Multiple messages on the communication channel, in various directions, may be included in a process of sending a secure communication from sender 150 to receiver 152.

As shown in FIG. 1, sender 150 includes laser 102, which may be a continuous wave laser. The output of laser 102 is split and directed to quantum preparer 104 and classical preparer 106, which are arranged in parallel. The information sent from sender 150 to receiver 152 is embodied in a classical optical signal by classical preparer 106. For example, the classical optical signal may be a telecommunications signal, e.g., an internet signal. Classical preparer 106 includes a classical optical modulator. Any of a variety of modulation schemes may be used by classical preparer 106. For example, classical preparer 106 may include any known classical optical communication modulation technique, such as any technique that is utilized in existing optical telecommunication channels, e.g., for internet communications. Example modulation techniques used by classical preparer 106 may include any of: Phase Shift Keying (PSK), Amplitude Shift Keying (ASK), Asymmetric Phase Shift Keying (APSK), Continuous Phase Modulation (CPM), Frequency Shift Keying (FSK), Pulse Position Modulation (PPM), Quadrature Amplitude Modulation (QAM), or Wavelet Modulation (WDM). Classical preparer 106 may further include encoding, error correction, and any other classical optical signal preparation techniques.

Quantum preparer 104 provides a quantum optical signal that is used to detect whether an attack has occurred on communication channel 160. The information represented by the quantum optical signal may be random or pseudo-random, for example. Quantum preparer 104 may include a quantum modulator that implements any of a variety of quantum optical modulation techniques. An example suitable quantum optical modulation technique is shown and described herein in reference to FIG. 2. Quantum preparer 104 may include randomly selecting bases with which to encode each outgoing quantum optical signal information unit and/or randomly selecting quadratures in which the information is modulated. In examples that randomly select such bases and/or quadratures, classical preparer 106 may include adding a representation of the randomly selected bases and/or quadratures to the classical optical signal, as described further below in reference to classical preparer 106. Quantum preparer 104 may further include encoding, error correction, and any other quantum optical signal preparation techniques.

Classical preparer 106 may further include adding, to the classical optical signal, information regarding the sent quantum optical signal. Such added information is used to determine whether there is a loss of correlation between the quantum optical signal sent by sender 150 and the quantum optical signal received by receiver 152. Such a loss of correlation may indicate an attack. In general, information in the received quantum optical signal is compared with information in the sent quantum optical signal in order to determine such a loss of correlation. The information in the received quantum optical signal may be determined based on information that indicates how it is to be detected and decoded, e.g., based in identification of quadratures that encode the information in the received quantum optical signal. Thus, the information regarding the sent quantum optical signal may include at least some of the information carried in the quantum optical signal prepared by quantum preparer 104, as well as information used to obtain the information in the received quantum optical signal. Information used to obtain the information in the received quantum optical signal may include indications of bases used to generate the quantum optical signal, and/or identifications of quadratures in which the information in the quantum optical signal is modulated. The information regarding the sent quantum optical signal may be delayed relative to the information in the quantum optical signal.

The outputs of quantum preparer 104 and classical preparer 106 are directed to the inputs of multiplexor 108. Multiplexor 108 combines the classical optical signal provided by classical preparer 106 and the quantum optical signal provided by quantum preparer 104 into a single combined optical signal. According to some examples, the classical optical signal is interleaved (e.g., not overlapping) with the quantum optical signal. For example, the quantum optical signal and the classical optical signal may be given respective timeslots, which may be at regular intervals, random intervals, or pseudorandom intervals. FIG. 1 depicts the combined classical optical signal and quantum optical signal schematically, where the classical optical signal 118 is interleaved with the quantum optical signal 122, with header information 120 in between. Some examples may omit header information 120. According to some examples, multiplexor 108 may be a time division multiplexor. The output of multiplexor 108 is passed to communication channel 160.

As shown in FIG. 1, the combined classical optical signal and quantum optical signal is sent from sender 150 to receiver 152 through communication channel 160. Communication channel 160 may be implemented as an optical communication channel based on optical fiber. Communication channel 160 may be, for example, a portion of a telecommunications network, e.g., an internet communication line. Communication channel 160 may include preexisting hardware to which quantum preparer 104, multiplexor 108, quantum detector 110, and post processing 114 are later added. For example, such preexisting hardware may include classical preparer 106, classical detector 112, and a fiber optics line therebetween.

Receiver 152 receives the combined classical optical signal and quantum optical signal from communication channel 160 and splits it for separate detection of the classical optical signal and the quantum optical signal. Each of classical detector 312 and quantum detector 310 may be performed for the respective portion of the combined optical signal. For example, the receiver may utilize a demultiplexer or may time which of quantum detector 310 or classical detector 312 is active for each respective time slot. Along the classical optical signal path, classical detector 112 may include any detection techniques suitable for the classical optical signal portion. Classical detector 112 may include demodulation, for example. Classical detector 112 may further include decoding and error correction. Classical detector 112 provides a signal that represents the classical data 116, which may be in the form of an electrical signal, e.g., a binary signal that encodes the communication sent from sender 150 to receiver 152. At least a portion of the retrieved classical data 116 is passed to post processing 114. For example, information regarding the sent quantum optical signal (e.g., information carried in the quantum optical signal, possibly together with information used to obtain the quantum optical signal by the receiver) may be passed to post processing 114. Further, the classical data 116 may be passed to another communication channel, or sent to a final destination, for example.

Along the quantum optical signal path, quantum detector 110 may include attenuation of the signal followed by demodulation of the quantum optical signal portion. Quantum detector 110 may include randomly selecting bases and/or quadratures with which to detect each incoming quantum optical signal increment. Quantum detector 110 may include using a fixed basis and/or fixed quadrature with which to detect the incoming quantum optical signal. Quantum detector 110 provides the retrieved information encoded in the quantum optical signal to post processing 114.

Post processing 114 uses the information in the quantum optical signal and the information in the classical optical signal for detecting a loss of correlation between the sent and received quantum optical signal to detect whether an attack has occurred. Post processing 114 may be performed by an electronic processor configured to perform the post processing techniques disclosed herein. For example, post processing 114 may compare a portion of the information sent in the quantum optical signal with a portion of the information carried in the classical optical signal that represents the information sent in the quantum optical signal. Post processing 114 may select the compared portions using the identification of bases and/or quadratures that is included in the classical optical signal. For example, post processing may select for comparison portions of the information in the received quantum optical signal that receiver 152 detected using the correct bases and/or quadratures.

A loss of correlation (e.g., above or below a predetermined threshold) may indicate that an attack has occurred on communication channel 160. The threshold may be set by a user and be based on the maximal amount of information that is permitted to leak out prior to triggering an alarm, the sensitivity of the system, e.g., how rapidly it can detect an attack, and the tolerance for false positives. Further, the threshold may be set after a calibration phase where the respective form of correlation loss is measured in the absence of an attack. For example, a possible threshold for detecting a tapping attack is 10% transmission for a 10 dB communication channel, where an attack is indicated if the transmission drops below the threshold. Taking into account practical implementation considerations such as temperature and weather, false alarms can be mitigated by forcing an attacker to acquire a higher amount of information (e.g., in a tapping or interrupt-resend attack). This can be accomplished by, for example adding extra noise to the classical optical signal or using classical encryption techniques for the classical optical signal.

The loss of correlation may be detected in a variety of forms. For example, the loss of correlation may be in the form of a loss of transmission, e.g., indicating that a portion of the quantum optical signal is missing. As another example, the loss of correlation may be in the form of a loss of bit values, e.g., indicating that a portion of the quantum optical signal received by receiver 152 is different from the quantum optical signal as originally sent by sender 150. As another example, the loss of correlation may be in the form of excess noise in the quantum optical signal. As another example, the loss of correlation may be in the form of fluctuations (e.g., standard deviation or variance) of any of the aforementioned forms, e.g., fluctuation of loss of transmission, fluctuation of loss of bit values, or fluctuation of excess noise. As another example, the loss of correlation may be in the form of an excess mean difference between modulation state values in the received quantum optical signal, discussed further in reference to FIG. 9. System 100 may detect any of a variety of attacks, including tapping attacks, jamming attacks, correlated jamming attacks, and interrupt-resend attacks based on a sufficient loss of correlation.

As shown in FIG. 1, post processing 114 is performed by receiver 152. However, in other examples, post processing may be performed by sender 150. In such examples, receiver 152 may convey to sender 150 the information detected in the quantum optical signal by receiver 152, as well as identifications of bases and/or quadratures that receiver 152 used to detect the information in the quantum optical signal. Sender 150 may detect a loss of correlation based on a comparison of, on the one hand, the information in the quantum optical signal detected by receiver 152 with, on the other hand, the information originally sent by sender 150 in the quantum optical signal. Sender 150 may perform such a comparison on information portions for which receiver 152 used the correct bases and/or quadratures with which to detect the quantum optical signal. According to examples in which sender 150 performs the post processing, sender 150 may omit from classical preparer 106 a representation of the information in the quantum optical signal. The loss of correlation, as well as the determination of whether it indicates an attack, may otherwise be as described above in reference to post processing 114 by the receiver.

System 100 may take various actions in response to detection of an attack. According to some examples, system 100 provides an alert, e.g., in the form of a message displayed on a computer monitor, sent in an email, or sent in a text message. According to some examples, system 100 may reroute the communication through a different part of a network that avoids communication channel 160 in response to detecting an attack.

Figure 2:
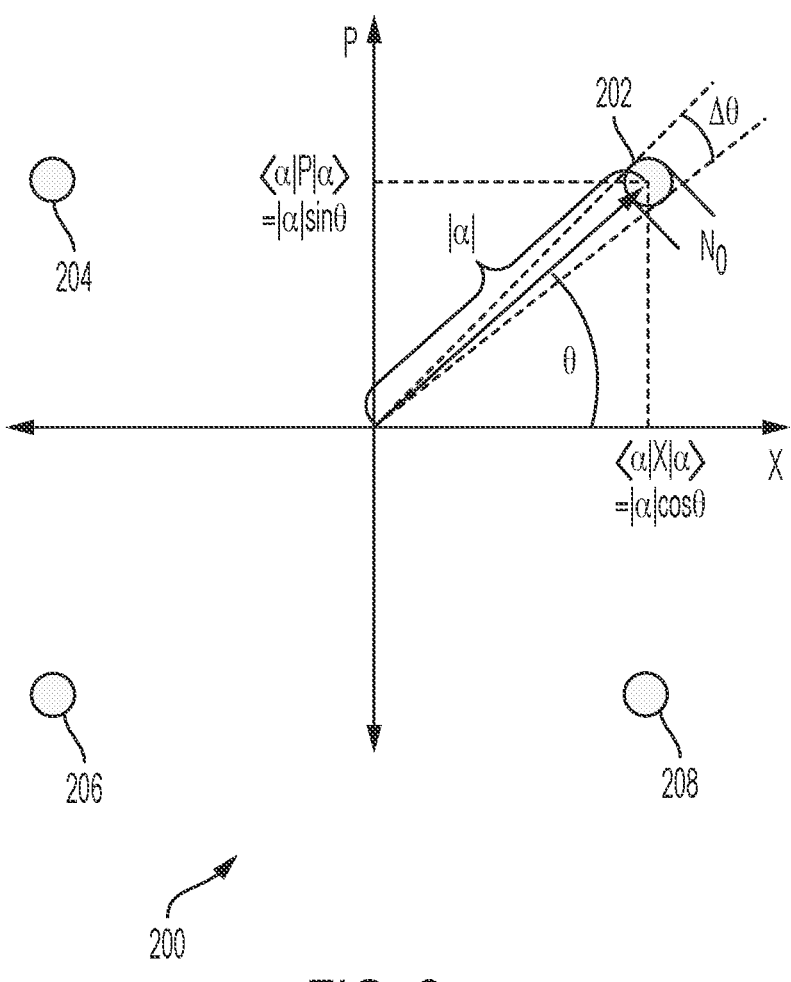
FIG. 2 is a schematic diagram of a quantum optical modulation technique according to various examples.

FIG. 2 is a schematic diagram of a quantum optical modulation technique 200 according to various examples. The quantum optical signal generated by the sender may have a variety of positions on the P/X quadrature (where P and X represent quadratures of a coherent state), where the positions indicate the information. As shown in FIG. 2, there are four possible positions, 202, 204, 206, and 208 (other suitable modulation examples may have more or fewer positions, e.g., 2, 8, 16, 32, etc.). In operation, the sender generates 2N random numbers $X_{i=1, \ldots, N}$, $P_{i=1, \ldots, N}$. Each N random numbers of $X_{i=1, \ldots, N}$ and $P_{i=1, \ldots, N}$ are prepared according to a centered normal Gaussian distribution with variance $V_A$. The sender prepares the coherent states $|X+iP>$ with the coordinates of quadratures X and P as $(X_i, P_i)_{i=1, \ldots, N}$ in the phase space using one or more modulators.

In FIG. 2, each circle at positions 202, 204, 206, and 208 represents the vacuum fluctuation, or the shot noise whose variance is $N_0$.

The quadratures X and Pin FIG. 1 may be implemented in a variety of optical properties. According to some examples, the quadratures X and P may be implemented as amplitude and phase. According to some examples, the quadratures X and P may be implemented as wavelength and phase. According to some examples, the quadratures X and P may be implemented as wavelength and amplitude. According to some examples, the quadratures X and P may be implemented as polarization and amplitude. According to some examples, the quadratures X and P may be implemented as polarization and phase. According to some examples, the quadratures X and P may be implemented as polarization and wavelength. By way of non-limiting example, this disclosure presents examples in terms of amplitude and phase, unless specified to the contrary, however, any of the quadratures described herein may be used by making suitable modifications to, or substitutions of, the disclosed hardware elements.

The receiver may use one or more pairs of photo detectors to capture the X portion of the quadrature signal and/or the P portion of the quadrature signal. An example may use one pair of photo detectors for one quadrature, e.g., two pairs of photodetectors for simultaneous measurement of both quadratures. An example may use another two pairs of photo detectors for polarization diversity.

An attack is detected via post-processing the quantum states measured by the receiver. This may be performed by comparing the information sent by the sender and received by the receiver to determine a loss of correlation, e.g., as indicated by a loss of transmission, a loss of bit values, and/or a presence of excess noise in the quantum optical signal. The comparing may be restricted to portions of information that the receiver detected correctly, e.g., using the same bases and/or quadratures as were used by the sender to send the information. The comparison may be performed at the sender's location or at the receiver's location.

FIG. 3 is a high-level schematic diagram of a system 300 for detecting an attack on an optical communication channel 360 that uses quantum optical preparation and classical optical preparation in series, according to various examples. As shown in FIG. 3, sender 350 sends a communication to receiver 352 over communication channel 360, which may be attacked. A corresponding system may be included and used to send messages from receiver 352 to sender 350 over communication channel 360 or over a different communication channel.

Sender 350 includes laser 302, which may be a continuous wave laser. The output of laser 102 is directed to quantum preparer 304 and classical preparer 306, which are arranged in series. FIG. 2 depicts classical preparer 306 following quantum preparer, however, according to some examples, this order may be reversed, with quantum preparer 304 following classical preparer 306.

The information sent from sender 350 to receiver 352 is embodied in a classical optical signal by classical preparer 306, e.g., modulated according to Amplitude Shift keying (ASK). The classical optical signal may be a telecommunication signal, e.g., an internet signal. Any of a variety of modulation schemes may be used by classical preparer 306, e.g., as described above in reference to FIG. 1. Classical preparer 306 may further include encoding, error correction, and any other classical optical signal preparation techniques. Classical preparer 306 may further include adding information regarding the sent quantum optical signal, used for determining whether there is a loss of correlation indicative of an attack, as described above in reference to FIG. 1.

Quantum preparer 304 provides a quantum optical signal that is used to detect whether an attack has occurred on communication channel 360. The information represented by the quantum optical signal may be random or pseudo-random. Quantum preparer 304 may include any technique as shown and described above in reference to quantum preparer 104 of FIG. 1. Quantum preparer 304 may include any of a variety of quantum optical modulation techniques. An example suitable quantum optical modulation technique is shown and described herein in reference to FIG. 2.

After processing by both quantum preparer 304 and classical preparer 306, the resulting laser beam includes both the classical optical signal provided by classical preparer 106 and the quantum optical signal provided by quantum preparer 104. According to some examples, the classical optical signal occurs simultaneously (e.g., overlaps) with the quantum optical signal. According to some examples, the quantum optical signal completely overlaps the classical optical signal, e.g., perpetually or over a time interval. Further description of such complete overlapping is presented below in reference to FIG. 4. According to some examples, the quantum optical signal overlaps the classical optical signal where (e.g., only where) the classical optical signal is at its lowest power state, e.g., amplitude. Further description of such partial overlapping is presented below in reference to FIG. 5. According to some examples, e.g., where the classical optical signal uses amplitude modulation, the quantum optical signal overlaps the classical optical signal where the classical optical signal represents zero-valued bits.

The combined classical optical signal and quantum optical signal is sent from sender 350 to receiver 352 through communication channel 360. Communication channel 360 may be implemented as shown and described above in reference to FIG. 1. FIG. 3 depicts the combined classical optical signal and quantum optical signal schematically in optical communication channel 360, where the combined optical signal 324 includes the classical optical signal and the quantum optical signal coextensive in an interval of time. FIG. 3 depicts blocks of such combined optical signals 324, with header information 320 in between. Some examples may omit header information 320.

Receiver 352 is similar to receiver 152 of FIG. 1, except that receiver 352 may have an adjusted threshold, relative to receiver 152, for determining whether a detected loss of correlation is indicative of an attack, and receiver 352 may utilize a different technique for determining when quantum detector 310 or classical detector 312 should be used to process the combined optical signal. For example, because the combined optical signal of system 300 may include information in the quantum optical signal portion simultaneously with information in the classical optical signal portion, activity of quantum detector 310 may overlap with activity of classical detector 312. Thus, receiver 352 receives the combined classical optical signal and quantum optical signal from communication channel 360 and splits it for separate detection of the classical optical signal and the quantum optical signal. Along the classical optical signal path, classical detector 312 may include any detection techniques suitable for the classical optical signal portion, as shown and described above in reference to classical detector 112 of FIG. 1.

Along the quantum optical signal path, quantum detector 310 may include attenuation, followed by demodulation of the quantum optical signal portion. Quantum detector 310 may otherwise be as shown and described above in reference to quantum detector 110 of FIG. 1.

Post processing 314 may be as shown and described above in reference to post processing 114 of system 100. For example, to detect an attack, post processing 314 of system 300 may be performed by receiver 352 or sender 350, e.g., as described above in reference to post processing 114 in system 100. System 300 may take various actions in response to detection of an attack, e.g., as described above in reference to system 100 of FIG. 1.

System 300 may detect any of a variety of attacks, including tapping attacks, jamming attacks, correlated jamming attacks, and interrupt-resend attacks. A detailed description of using an example of system 300 to detect an interrupt-resend attack is presented below in reference to FIG. 6.

Figure 4:
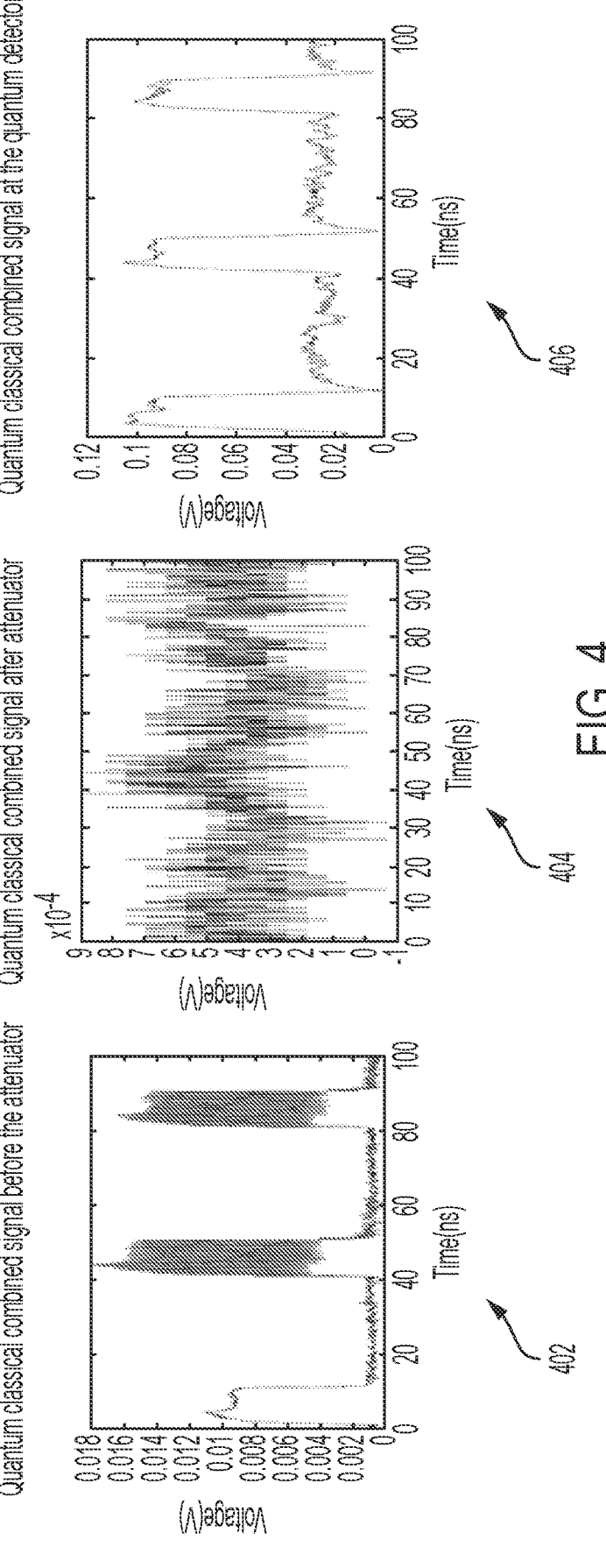
FIG. 4 depicts charts representing overlaid quantum and classical optical signals according to various examples.

FIG. 4 depicts charts representing overlaid quantum and classical optical signals according to various examples. As shown in FIG. 4, the quantum optical signal overlaps all of the depicted classical optical signal. The combined optical signals have a classical optical signal data rate of 5 Gb/s on top of a quantum optical signal with pulse width of 10 ns. The repetition rate is 25 MHz. Charts 402, 404, and 406 illustrate the combined optical signals and their ability to be separated functionally, while still being able to apply techniques disclosed herein to detect an attack. According to a particular example, chart 402 illustrates the quantum and classical combined voltage signal over time before the variable optical attenuator 1062, chart 404 illustrates the quantum and classical combined signal over time after the variable optical attenuator 1062, and chart 406 illustrates the quantum and classical combined voltage signal at the quantum detector 1040.

Figure 5:
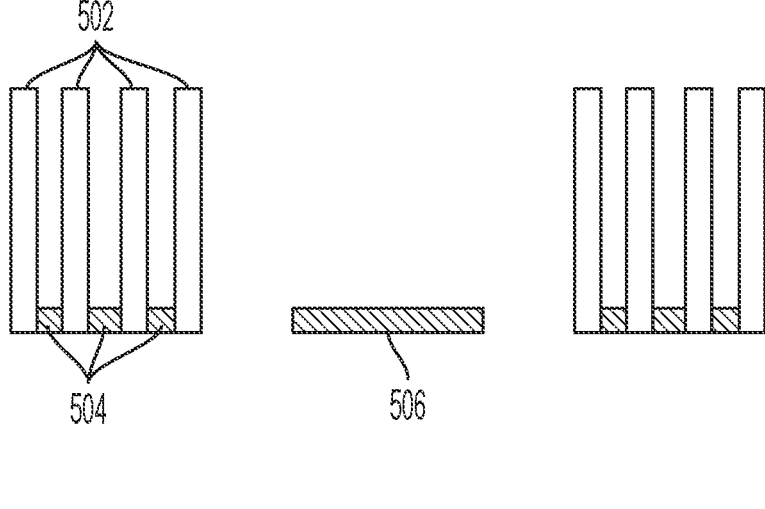
FIG. 5 is a diagram representing overlaid quantum and classical optical signals according to various examples.
Figure 5:

FIG. 5 is a diagram representing overlaid quantum and classical optical signals 500 according to various examples. As described above in reference to system 300 of FIG. 3, some examples may overlay the quantum optical signal on the classical optical signal on portions of the classical optical signal that have a minimal power level, e.g., amplitude. According to some examples and by way of non-limiting example, such minimal amplitude portions of the classical optical signal may correspond to bits having value zero. Optical signals 500 depict classical high-power signals 502 and classical low power signals 504, 506. Quantum optical signals may be overlaid on classical low power signals 504, 506, e.g., according to examples of system 300 of FIG. 3. Embodiments that overlay the quantum optical signal onto portions of the classical optical signal with minimal power level may avoid potential difficulties of detecting the quantum signal when the classical signal displacement is relatively large.

Systems disclosed herein, including system 100 of FIG. 1 and system 300 of FIG. 3, may be used to detect a variety of attacks, including interrupt-resend attacks. Interrupt-resend attacks may include classical interrupt-resend attacks, which interrupt and resend only a classical optical signal, and quantum interrupt-resend attacks, which interrupt and resend both classical optical signals and quantum optical signals. Systems disclosed herein may detect a classical intercept-resend attack, where the attacker resends only the classical optical signal, by detecting a loss of correlation in the form of a quantum transmission drop to zero and/or a sharp increase in excess noise in the quantum optical signal. Systems disclosed herein may also detect a quantum intercept-resend attack, where the attacker attempts to resend the quantum optical signal as well as the classical optical signal. A description of how system 300 of FIG. 3 may detect a quantum interrupt-resend attack is presented below in reference to FIG. 6.

Figure 6:
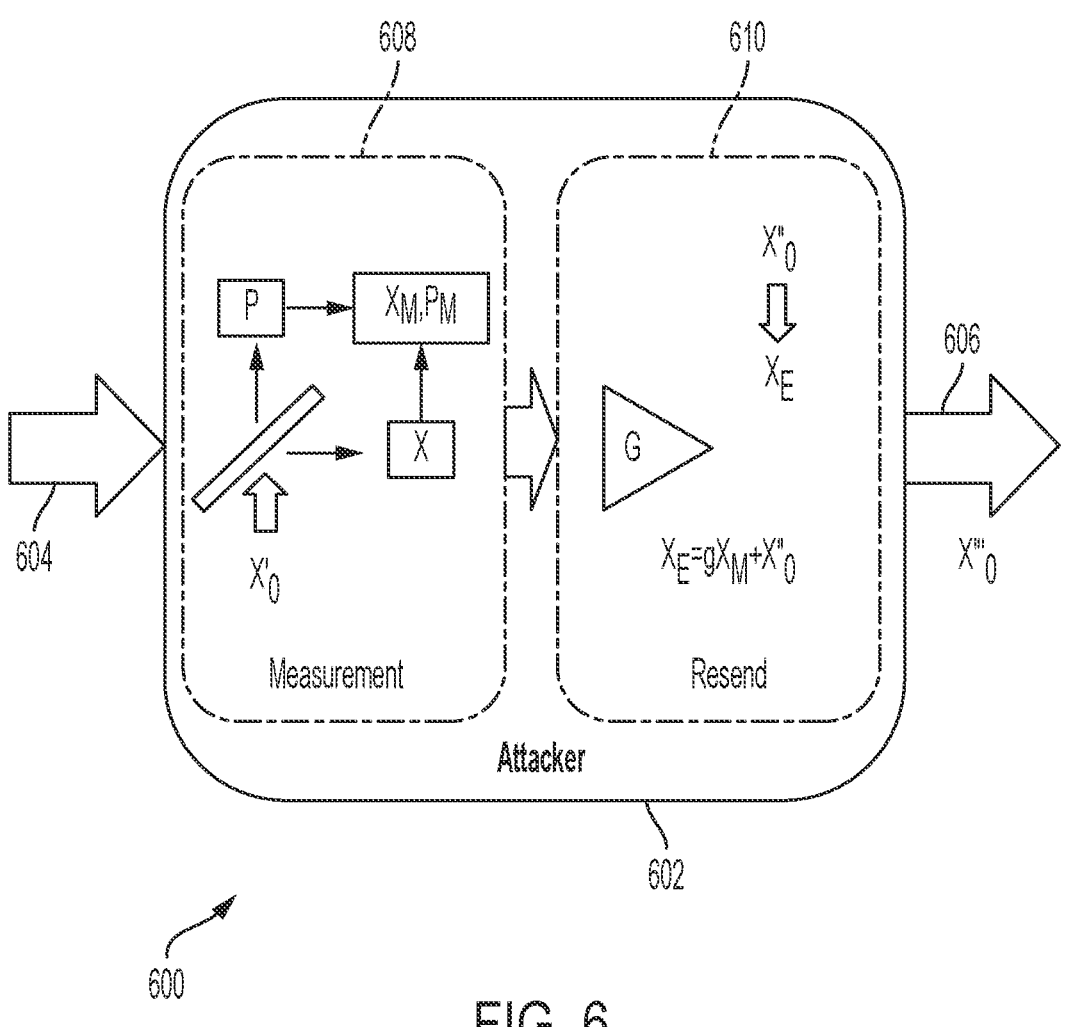
FIG. 6 is a schematic diagram depicting a system for conducting a quantum interrupt-resend attack according to various examples.

FIG. 6 is a schematic diagram depicting a system 600 for conducting a quantum interrupt-resend attack according to various examples. Attacker 602 taps an optical communication line to acquire a portion of the signal 604. In terms of the classical optical signal, attacker 602 may measure and resend the classical optical signal using known techniques (not shown), which are generally successful at avoiding detection. However, in terms of the quantum optical signal, attacker 602 may try to detect the quantum optical signal using measurement apparatus 608 and resend an attempted replica 606 of the quantum optical signal using resend apparatus 610. Attacker 602 directs the attempted replica 606 back on the same optical communication line, in the same direction that it was originally being sent. However, due to properties of quantum mechanics, attacker 602 cannot make perfect copies of the sender's states, and the receiver would detect an increase of two shot noise units by his quantum excess noise monitoring, as described in detail presently.

By way of non-limiting example, attacker 602 attempts a quantum interrupt-resend attack on the communication channel 360 of system 300 of FIG. 3, where the sender uses the quantum optical modulation technique 200 of FIG. 2. The information in the quantum optical signal is modulated in quadrature information (X, P) and sent by the sender, where $(X_A, P_A)$ follows a Gaussian distribution with variance $V_A$. The shot noise variance is denoted $N_0$. Encoding the information onto a coherent state results in:

$$X = X_A + X_0 \tag{1}$$

$$P = P_A + P_0 \tag{2}$$

In Equations (1) and (2), $X_0$ and $P_0$ represent the noise caused by vacuum fluctuation. Attacker 602 in the middle cuts down the quantum channel and intercepts all the pulses sent from the sender. The actions of attacker 602 include two steps: quadrature measurement by measurement apparatus 608 and recreation of the quadratures by resending apparatus 610. To measure both $X_A$ and $P_A$ quadratures, attacker 602 uses two pairs of photo detectors (e.g., as shown and described herein in reference to FIG. 7), which may generate results described as:

$$X_M = \frac{1}{\sqrt{2}}\left(X_A + X_0 + X_{0'} + X_{N_{A,E}}\right) \tag{3}$$

$$P_M = \frac{1}{\sqrt{2}}\left(P_A + P_0 + P_{0'} + P_{N_{A,E}}\right) \tag{4}$$

In Equations (3) and (4), $X_0'$ and $P_0'$ are noise terms due to the 50:50 beam splitter before measurement apparatus 608. The term $X_{N_{A,E}}$ represents random noise induced by the sender's modulation and the attacker's measurement noise caused by measurement apparatus 608.

Resend apparatus 610 then resends quantum states by encoding $(X_E, P_E)$ onto a new coherent state according to the measurement $(X_M, P_M)$ of measurement apparatus 608. Resend apparatus 610 can also induce an amplification (G) on the data $X_M$ that is resent. The following depicts the results for X quadrature; the analysis is the same for the P quadrature. Hence, the X quadrature of the coherent state resent by resend apparatus 610 can be expressed as:

$$X_E = GX_M + X_0'' = \frac{G}{\sqrt{2}}\left(X_A + X_0 + X_0' + X_{N_{A,E}}\right) + X_0'' \tag{5}$$

In Equation (5), $X''_0$ is a noise term added by resend apparatus 610 due to modulation. Note that $X_0$, $X'_0$, $X''_0$ all follow the shot noise distribution, e.g., $N\sim(0, N_0)$.

At the receiver side, the receiver performs a detection on the coherent state resent by attacker 602 using two pairs of photo detectors. The measured quadrature $X_B$ can be written as:

$$X_B = t(X_E + X_{N_{E,B}}) + \sqrt{1 - t^2}X'''_0 + X_{ele} \tag{6}$$

After the transmission though the lossy channel 360, the receiver's received state will have three noise terms, for example, the noise added by attacker (602) $X_{N_{E,B}}$, the vacuum noise $\sqrt{1-t^2}X'''_0$ due to channel, and the receiver's detection noise $X_{ele}$ are added to the states resent by attacker 602. Here $t = \sqrt{\eta T}$, where T is the channel loss between attacker 602 and the receiver, and $\eta$ is the receiver's detector efficiency. The correlation between the sender and the receiver using the Gaussian linear model may be described as:

$$Cov(X_A, X_B) = \langle X_A X_B \rangle - \langle X_A \rangle \langle X_B \rangle = \frac{tg}{\sqrt{2}} \langle X_A^2 \rangle \tag{7}$$

$$\text{Var}(X_B) = \tag{8}$$

$$\langle X_B^2 \rangle - \langle X_B \rangle^2 = \frac{t^2 g^2}{2}[\text{Var}(X_A) + 2N_0 + \xi_{sys}] + \left(1 - t^2\right)N_0 + t^2 N_0 + v_{ele} =$$

$$\eta T \frac{G}{2}\text{Var}(X_A) + \eta T \frac{G}{2}(2N_0 + \xi_{sys}) + N_0 + v_{ele}$$

In Equations (7) and (8), the channel transmission estimation is $$\left(\frac{tg}{\sqrt{2}}\right)^2 = \frac{TG}{2}.$$

In order to compensate the loss from the receiver's detection using two pairs of photo detectors, an amplification coefficient may be selected as $g = \sqrt{2}$, so that the overall loss is maintained. The excess noise estimation on the sender's side can be written as $\hat{\xi} = 2N_0 + \xi_{sys}$. As a result, even $\xi_{sys} = 0$, e.g., even if attacker 602 has a perfect system 600 that introduces no noise, at least two shot noise units will be added to the receiver's received signal after the intercept-resend attack. Hence, in the step of post-processing, the extra noise will be detected easily. In other words, it is not possible to resend a perfect replica of the sender's quantum states.

III. EXAMPLE HARDWARE

This section describes in detail various hardware systems, including specific systems for sending and receiving information and detecting attacks on an optical communication channel. System 100 of FIG. 1 and system 300 of FIG. 3 may be implemented using the hardware and techniques described in this section. Some examples shown and described in this section depict how quantum preparer 104 and quantum detector 110 of system 100, and quantum preparer 304 and quantum detector 310 of system 300, may be implemented. Thus, examples shown and described in this section may be joined with existing or known implementations of classical preparer 106, multiplexor 108, classical detector 112, classical preparer 306, and classical detector 312, as shown and described in reference to FIGS. 1 and 3. Examples according to this section may are disclosed as detecting attacks on communications sent from the sender to the receiver; however, it is to be understood that examples may include a corresponding system to detect attacks on communications sent from the receiver to the sender on the same, or on a different, communication channel.

Figure 7:
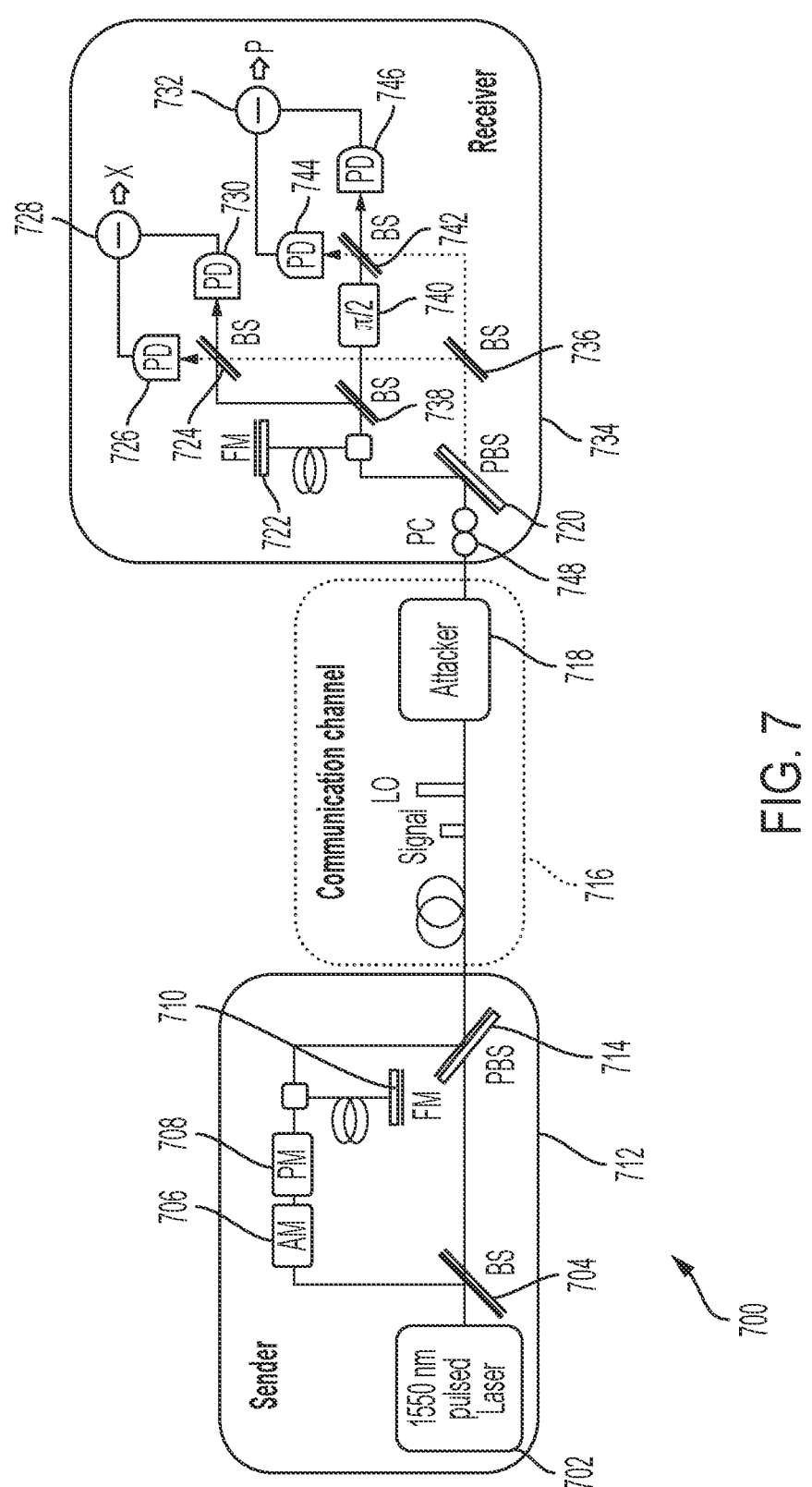
FIG. 7 is a schematic diagram of a system that uses multiple pairs of photo detectors for detecting an attack on an optical communication channel.

FIG. 7 is a schematic diagram of a system 700 that uses multiple pairs of photo detectors for detecting an attack on an optical communication channel. System 700 may be joined with a classical optical communication system as shown and described in reference to system 100 of FIG. 1 or system 300 of FIG. 3 in order to detect attacks on the classical optical communication channel. In system 700, the quantum optical signal may be prepared as shown and described above in reference to FIG. 2. System 700 may be used to send information from sender 712 to receiver 734 while detecting attacks on communication channel 716, which may include attacker 718. A corresponding system may be used to detect attacks on information sent from receiver 734 to sender 712 in the same or a different communication channel.

Sender 712 includes 1550 nm pulsed laser 702, which produces a laser beam that is directed to beam splitter 704, e.g., a 50:50 half-silvered mirror beam splitter. One path out of beam splitter 704 is directed to amplitude modulator 706 and phase modulator 708 channels, as well as to Faraday mirror 710, the latter of which protects against counter-propagating light and forms a polarization-preserving delay line. This path carries the quantum optical signal. The other path out of beam splitter 704 carries a local oscillator. One of the paths, the quantum optical beam or the local oscillator beam, may be polarized at 90° with respect to the other path. Polarizing beam splitter 714 re-combines the quantum optical signal with the local oscillator, and the combination beam is propagated through communication channel 716. Note the presence of the quantum optical signal as well as the local oscillator (LO) in the communication channel 716, each polarized at 90° to each-other to allow for later separation, e.g., by a polarizing beam splitter. The local oscillator beam allows receiver 734 to efficiently and more accurately detect information in the quantum optical signal. According to some examples, the local oscillator beam is not combined with the quantum optical signal beam, rather, according to such examples, the local oscillator beam is sent is a separate optical communication channel, e.g., on a separate optical fiber. According to some examples, the local oscillator beam is not produced by sender 712. According to such examples, receiver 734 may generate a local oscillator beam, e.g., using a laser that is included in the system of receiver 734.

Receiver 734 receives the combined beam, which is passed to polarization controller 748 and then to polarizing beam splitter 720. Polarizing beam splitter 720 produces quantum optical signal paths (solid lines) and local oscillator paths (dotted lines). The quantum optical signal path from polarizing beam splitter 720 is passed to Faraday mirror 722 and then on to beam splitter 738, which provides portions (e.g., 50% each) of the quantum optical signal path to beam splitter 724 and to phase shifter 740. Faraday mirror protects against counterpropagating light and forms part of a polarization-preserving delay line. From phase shifter 740, the beam is directed to beam splitter 742. The local oscillator path from polarizing beam splitter 720 is passed to beam splitter 736, which provides portions (e.g., 50% each) of the local oscillator to beam splitter 724 and to beam splitter 742. (Alternately, according to some examples, receiver 734 generates a local oscillator beam locally.) The outputs from beam splitter 724 are coupled to photo detector pair 726, 730. The outputs from beam splitter 742 are coupled to photo detector pair 744, 746. Receiver 734 may utilize a heterodyne detection technique that measures multiple quadratures according to some examples. Photo detector pairs 726, 730 and 744, 746 detect information modulated into respective quadratures, e.g., amplitude X and phase P. In particular, the electrical outputs of photo detector pair 726, 730 are directed to comparator 728, which provides an electrical signal representing the X quadrature, and the electrical outputs of photo detector pair 744, 746 are directed to comparator 732, which provides an electrical signal representing the P quadrature. Each photo detector pair 726, 730 and 744, 746 may detect information in its respective quadrature by detecting coincidences and differences between the quantum optical signal and the local oscillator. Random phase changes due to, e.g., propagation in the communication channel, may cancel due to the use of multiple photo detectors.

The information detected in the quadratures may be represented in one or more electrical signals. These electrical signals are used for post processing to detect an attack. For example, the information in the quantum optical signal may be sent to an electronic processor, along with information regarding the sent quantum optical signal, used for determining a loss of correlation, as described above in reference to FIGS. 1 and 3. The electronic processor may be configured to perform post processing, e.g., post processing 114 as shown and described above in reference to FIG. 1, and/or post processing 314 as shown and described above in reference to FIG. 3. Additional techniques for post processing are described presently.

Ideally, the sender and the receiver communicate through a lossless and noiseless channel, so that any increase in excess noise or loss is due to an eavesdropper. In practice, however, the instantaneous fluctuations and long-term drift in loss and channel excess noise should be accounted for to avoid false alarms. Differentiation of a false alarm from an actual eavesdropping event can be achieved using statistical techniques, such as change point detection, Bayesian change point detection, supervised learning, or cumulative sum (CUSUM). An example CUSUM algorithm is presented in Table 1 below. The algorithm is able to identify the small changes within a large data set. The algorithm may be adjusted by setting a shorter block length for a faster reaction time, but with a larger estimation uncertainty, or by setting a longer block length for smaller estimation uncertainty, but with a longer reaction time.

TABLE 1

| Algorithm 1: |
| --- |
| CUSUM algorithm for security monitoring |

Result: Stop when exceeding the threshold
initialization
    set $\delta$ to the most likely change magnitude
    set the detection threshold h > 0

TABLE 1-continued

_____

Algorithm 1:
_____

CUSUM algorithm for security monitoring
_____

$S^i[-1] = G_Y{}^i[-1] = S^d[-1] = G_Y{}^d[-1] = 0$ initialize the estimator $\hat{\mu}_Y$ and $\hat{\sigma}_Y^2$ k=0 end while the monitoring is not stopped do measure the current sample x[k];

calculate the current estimator $\hat{\mu}_Y[k]$ and $\hat{\sigma}_Y^2[k]$;

$$s^i[k] = \frac{|\delta|}{\hat{\sigma}_Y^2[k]}\left(x[k] - \hat{\mu}_Y[k] - \frac{|\delta|}{2}\right);$$

$$s^d[k] = -\frac{|\delta|}{\hat{\sigma}_Y^2[k]}\left(x[k] - \hat{\mu}_Y[k] + \frac{|\delta|}{2}\right);$$

$S^i[k] = S^i[k-1] + s^i[k]$; $S^d[k] = S^d[k-1] + s^d[k]$;

$G_Y{}^i[k] = \{G_Y{}^i[k-1] + s^i[k]\}^+$; $G_Y{}^d[k] = \{G_Y{}^d[k-1] + s^{id}[k]\}^+$;

if $(G_Y{}^i\{[k] > h > 0) \cup (G_Y{}^d[k] > h > 0)$ then $n_d \leftarrow k$;

if $(G_Y{}^i[k] > h > 0)$ then $\hat{n}_c = \text{argmin}_{1 \le n_c \le k} S^i[n_c - 1]$;

end if $(G_Y{}^d[k] > h > 0)$ then $\hat{n}_c = \text{argmin}_{1 \le n_c \le k} S^d[n_c - 1]$;

end stop or reset the algorithm;

end k = k + 1;

end
_____

Figure 8:
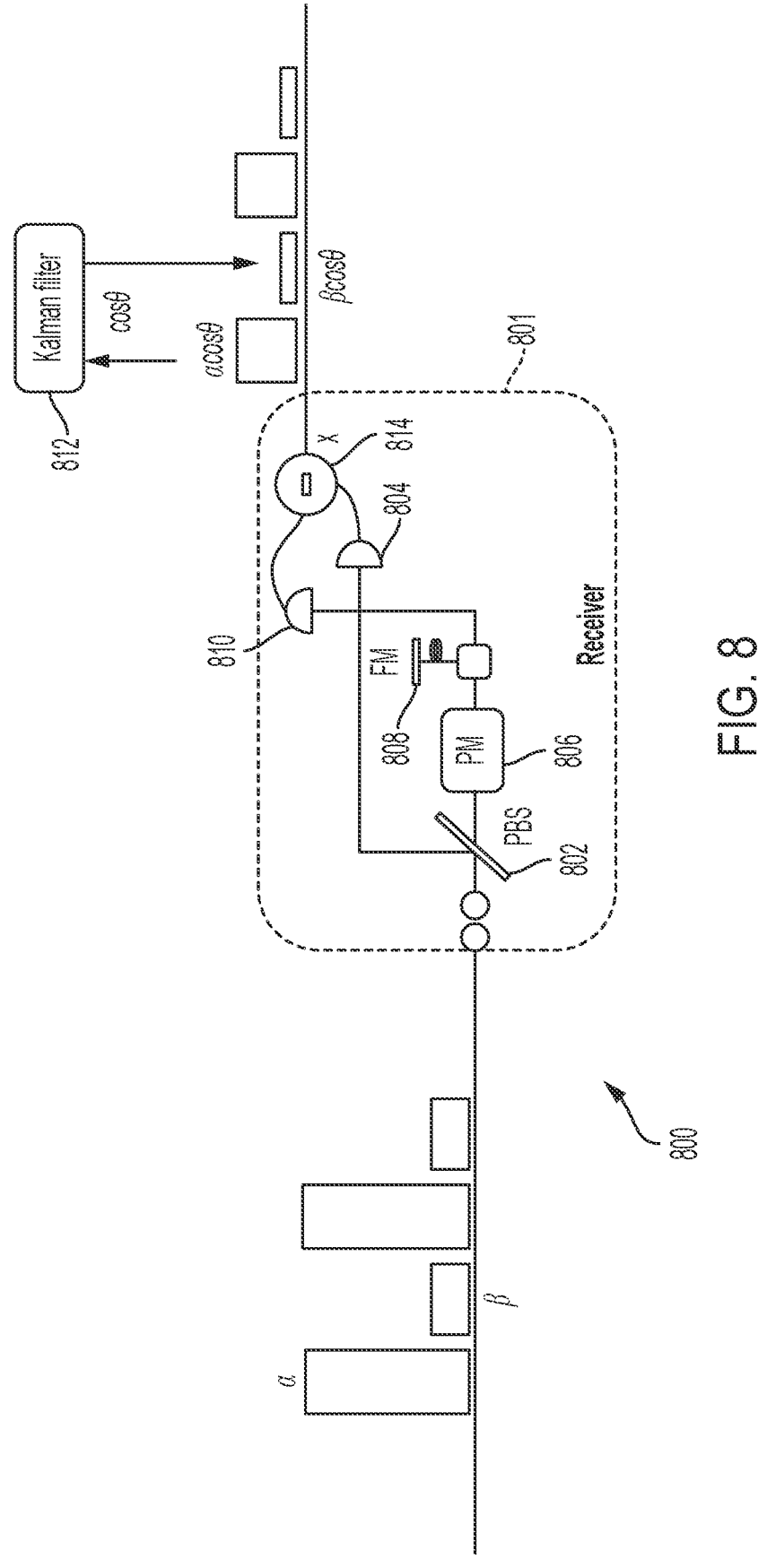
FIG. 8 is a schematic diagram of a system that uses a single pair of photo detectors for detecting an attack on an optical communication channel.

FIG. 8 is a schematic diagram of a system 800 that uses a single pair of photo detectors for detecting an attack on an optical communication channel. For some applications, the more inexpensive hardware of using a single pair of photo detectors is an acceptable tradeoff for a lower bit rate. System 800 may be joined with a classical optical communication system as shown and described in reference to system 100 of FIG. 1 or system 300 of FIG. 3 in order to detect attacks on the classical optical communication channel. System 800 may include a sender, by way of non-limiting example, sender 712, as shown and described in reference to system 700 of FIG. 7. System 800 may be joined with classical optical preparation, e.g., as shown and described herein in reference to FIGS. 1 and 3, and used to send information from sender 712 to receiver 801 while detecting attacks on the communication channel. A corresponding system may be used to detect attacks on communications sent from receiver 801 to sender 712 in the same or in a different communication channel.

In system 800, the quantum optical signal may be prepared by the sender as shown and described above in reference to FIG. 2, e.g., may be prepared using amplitude modulation, or may be prepared in a different manner. By way of non-limiting example, sender 712 for system 800 may send information as represented by two states, alpha ($\alpha$) and beta ($\beta$). For some examples in which modulation as shown and described in reference to FIG. 2 is used, these states may represented in either quadrature. For some examples in which modulation as shown and described in reference to FIG. 2 is used, these states may be represented in both quadratures, e.g., by randomly selecting a quadrature to measure for each information unit. Information obtained by the receiver from incorrectly measured quadratures may be removed in post processing. For examples in which amplitude modulation is used, these states may be represented by two amplitude levels.

At receiver 801, a beam splitter may be used to split the received signal into a portion for classical optical processing (not shown in FIG. 8) and a portion for quantum optical signal processing. The quantum optical signal processing may proceed as follows. The quantum optical signal portion of the combined quantum optical signal and local oscillator sent from the sender is passed to polarizing beam splitter 802. (In some examples, the sender omits the local oscillator, and receiver 801 generates the local oscillator as part of its system.) The signal path from polarizing beam splitter 802 is directed to photo detector 804, and the local oscillator path from polarizing beam splitter 802 is directed to an input to phase modulator 806. The output of phase modulator 806 is directed to Faraday mirror 808 and then on to photo detector 810. Faraday mirror protects against counterpropagating light and forms part of a polarization-preserving delay line. The outputs of photo detectors 804, 810 are provided to comparator 814, which outputs the received information in the quantum optical signal, e.g., as an electrical signal. The difference of the measured intensities as determined by comparator 814 is proportional to the quadrature amplitudes, e.g., alpha and beta. Kalman filter 812 is used to predict and account for phase fluctuations in the quantum optical signal, e.g., due to propagation in the optical communication channel.

The measurement choice of X or P quadratures by receiver 801 may be decided by the phase of the local oscillator relative to the quantum optical signal. The local oscillator, which is an intense coherent state, has an amplitude $|\alpha LO| >> \sqrt{N_0}$. At the output of the beam splitter, the number of photons in both arms may be described by the following operators:

$$n_1 = \frac{1}{2}\left(a_{lo}^\dagger + a_{in}^\dagger\right)(a_{lo} + a_{in}) \tag{9}$$

$$n_1 = \frac{1}{2}\left(a_{lo}^\dagger + a_{in}^\dagger\right)(a_{lo} + a_{in}) \tag{10}$$

And the difference can be represented as:

$$\Delta I = 4N_0(n_1 - n_2) = 4N_0\left(a_{10}^\dagger a_{in} + a_{in}^\dagger a_{10}\right) \tag{11}$$

Because the intensity of the local oscillator is high, it can be modeled as classical light. Hence Equation (11) becomes:

$$\Delta I \approx 4N_0\left(\frac{\alpha_{lo}^*}{2\sqrt{N_0}}a_{in} + \frac{\alpha_{lo}}{2\sqrt{N_0}}a_{in}^\dagger\right) = \tag{12}$$

$$|\alpha_{lo}|2\sqrt{N_0}\left(e^{-i\theta}a_{in} + e^{i\theta}a_{in}^\dagger\right) = 2|\alpha_{lo}|\left(\cos\theta\hat{x} + \sin\theta\hat{p}\right)$$

Consequently, it is possible to measure values represented in either the X or P quadrature by changing the phase of the local oscillator relative to the quantum optical signal. This may be accomplished using phase modulator 806, which is shown in FIG. 8 as being located in the local oscillator branch. In other examples, the phase modulator may be located in the quantum optical signal branch. Receiver 801 may select either quadrature for measurement, or may randomly select which quadrature to measure for each information unit.

For examples that measure one quadrature, post processing may remove information sent using the other quadrature.

Examples that measure one quadrature may utilize homo-dyne detection. In general, examples may remove the influence of the phase varying in the communication channel in post processing. In addition, because of the potential for random phase due to, e.g., propagation in the communication channel, the output may vary with time, but this situation can be mitigated with a large classical optical signal as a reference to estimate the random phase, e.g., using a Kalman filter. Alternately, or in addition, this situation may be addressed by including extra headers with the quantum optical signal for the purpose of classical phase recovery.

Figure 9:
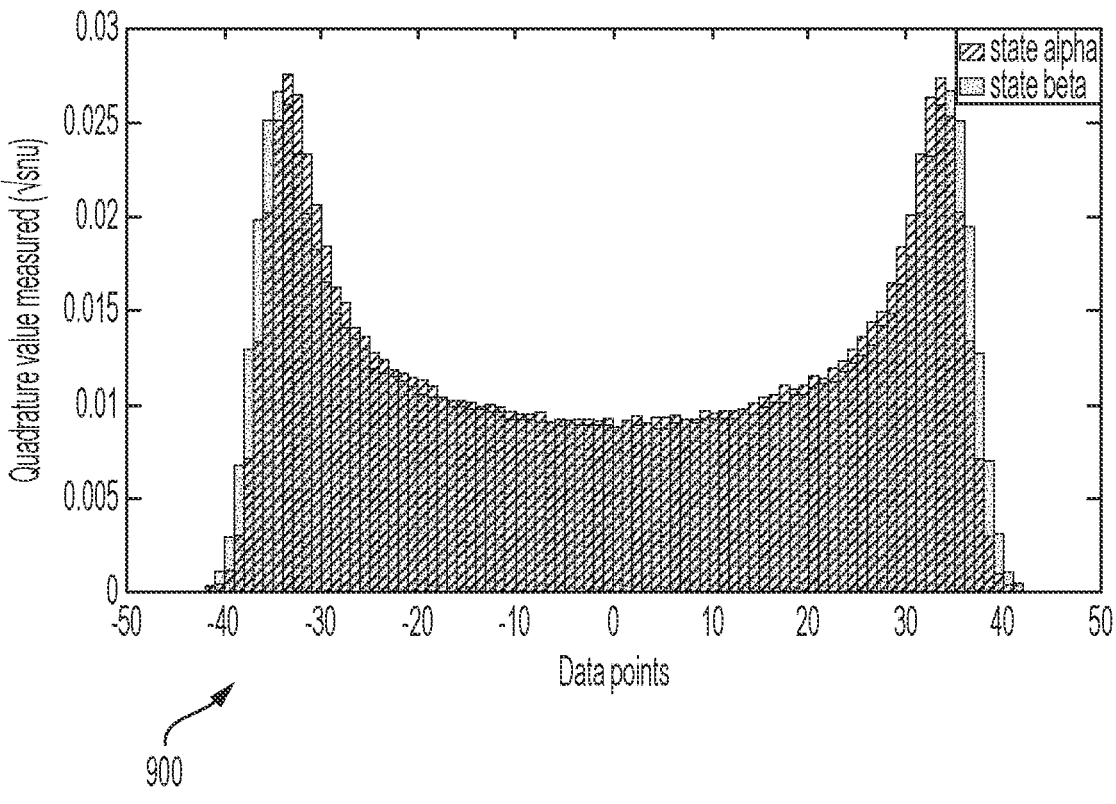
FIG. 9 is a simulated histogram depicting a technique for detecting a loss of correlation indicative of an attack on an optical communication channel as detected by a system that uses a single pair of photo detectors according to various examples.

FIG. 9 is a simulated histogram 900 depicting a technique for detecting a loss of correlation indicative of an attack on an optical communication channel as detected by a system that uses a single pair of photo detectors according to various examples. The technique described presently in reference to FIG. 9 may be used with system 800 of FIG. 8 to detect a loss of correlation that indicates an attack. However, the detection technique described presently is not limited to use with system 800.

The received quantum optical signal can be expressed according to the equation:

$$X = A \cos \theta + N. \tag{13}$$

In Equation (13), A is the amplitude of the quantum state, $\theta$ is the angle between the state and the local oscillator signal in the phase space, and N is the noise term, which includes the vacuum noise and also the system noise. The local oscillator may be regarded as free running according to some examples, so the angle $\theta$ follows a uniform distribution, which may be represented as:

$$\rho(\theta) = \begin{cases} \frac{1}{2\pi}; & 0 < \theta < 2\pi \\ 0; & o.w. \end{cases} \tag{14}$$

Accordingly, examples may determine whether a loss of correlation indicative of an attack exists by analyzing the received distribution, e.g., as represented by histogram 900. For example, for quantum modulation of two states (alpha and beta), the loss of correlation may be determined as the mean difference between the two levels. Histogram 900 depicts the quadrature value measured, in terms of the square root of shot noise levels, for each of the two states. If such a mean difference exceeds a threshold, then an attack may be indicated. In general, the loss of correlation may be determined as an excess mean difference between modulation state values. This type of loss of correlation detection may be repeated for incoming data, e.g., by using a sliding window of values for which to compute the difference between mean levels.

IV. EXPERIMENTAL SYSTEMS AND RESULTS

This section described various experimental systems and results. The experimental systems presented in some instances represent proof of concept studies. Some of the experimental systems have been implemented, and in such cases, test results are presented herein. However, some of the experimental systems presented herein are not intended for use in a deployed system without modification. For example, some experimental systems shown and described in this section use an oscilloscope to determine a loss of correlation; in deployed systems, the oscilloscope would be replaced by dedicated electronics that, e.g., determines whether a loss of correlation is sufficient to indicate an attack. As another example, some experimental systems shown and described in this section include out-of-band communications between the sender and receiver that are used to coordinate the sender and receiver systems and analyze results; in deployed systems, such out-of-band communications may be unnecessary and omitted. As another example, the experimental systems disclosed in this section are not integrated with classical optical communication systems; in deployed systems, such integration would allow for detecting attacks on classical optical communication systems, such as telecommunication networks, e.g., on internet communication lines.

Portions of system 100 of FIG. 1 and system 300 of FIG. 3 may be implemented using hardware and techniques described in this section. Some examples shown and described in this section depict experimental implementations of quantum preparer 104 and quantum detector 110 of system 100, and quantum preparer 304 and quantum detector 310 of system 300. Thus, examples shown and described in this section may be modified for deployment and joined with existing or known implementations of classical preparer 106, multiplexor 108, classical detector 112, classical preparer 306, and classical detector 312, as shown and described in reference to FIGS. 1 and 3. Examples according to this section may are disclosed as detecting attacks on communications sent from the sender to the receiver; however, it is to be understood that examples may include a corresponding system to detect attacks on communications sent from the receiver to the sender on the same, or on a different, communication channel.

Figure 10:
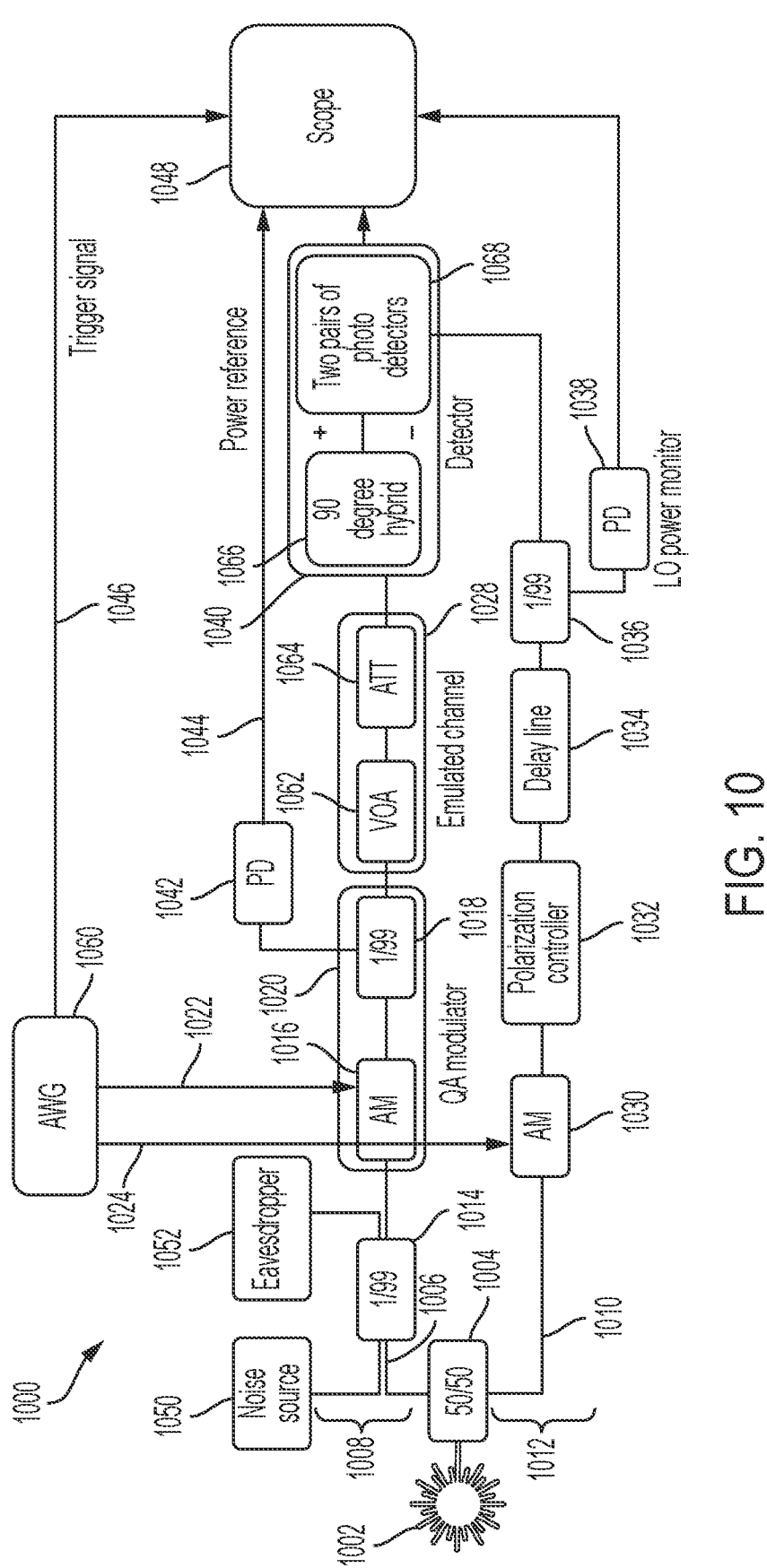
FIG. 10 is a schematic diagram of a first experimental system for detecting an attack on an optical communication channel according to various examples.

FIG. 10 is a schematic diagram of a first experimental system 1000 for detecting an attack on an optical communication channel according to various examples. System 1000 represents a simulated sender (e.g., including but not limited to elements 1002, 1016) a simulated receiver (e.g., including but not limited to elements 1066, 1068), a simulated optical communication channel (e.g., including but not limited to elements 1062, 1064), and a simulated attacker (e.g., including but not limited to elements 1050, 1052).

System 1000 includes laser 1002, which may be a continuous wave laser. Laser 1002 may be a coherent source carrier that also provides a stable beam. The output of laser 1002 is coupled to 50:50 beam splitter 1004, which may be implemented as a half-silvered mirror. The outputs of 50:50 beam splitter 1004 provides beam 1006, which initiates quantum optical signal path 1008, and beam 1010, which initiates reference beam path 1012. Quantum optical signal path 1008 carries information used to detect an attack. Reference beam path 1012 provides a local oscillator, as well as a reference used for timing between the simulated sender and receiver in experimental system 1000. Along the quantum optical signal path 1008, beam 1006 is directed to a first input of 1:99 beam splitter 1014.

A second input of 1:99 beam splitter 1014 is configured to receive an input from noise source 1050. The 99% side of the output of 1:99 beam splitter 1014 is directed to an input of quantum amplitude (QA) modulator 1020. The 1% side of the output of 1:99 beam splitter 1014 is tapped off to eavesdropper 1052. Eavesdropper 1052 may be implemented as an oscilloscope in experimental system 1000. Noise source may be implemented using an erbium doped fiber amplifier, for examples. To simulate a jamming attack, noise source 1050 may be used, to simulate a tapping attack, eavesdropper 1052 may be used, and to simulate a correlated jamming attack, both noise source 1050 and eavesdropper 1052 may be used. The elements of the simulated attacker, namely noise source 1050 and eavesdropper 1052, appear prior to the modulator 1020 in the quantum optical signal path. This arrangement permits testing system 1000 for detecting, e.g., jamming attacks and correlated jamming attacks. However, more generally, the attacker may appear just prior to, in, or just after emulated channel 1028. In such arrangements, system 1000 may be used to detect any of the attack types described herein.

QA modulator 1020 includes amplitude modulator 1016 and 1:99 beam splitter 1018. An input to QA modulator 1020 is passed to an input to amplitude modulator 1016. QA modulator 1020 is configured to receive control signal 1022 from arbitrary wave generator 1060. Arbitrary wave generator 1060 also provides control signal 1024 to amplitude modulator 1030 and trigger signal 1046 to oscilloscope 1048. Amplitude modulator 1016 impresses information from control signal 1022 onto its input optical signal to produce an amplitude modulated quantum optical signal. The amplitude modulated quantum optical signal is directed to an input to 1:99 beam splitter 1018. The 1% output of 1:99 beam splitter 1018 is directed to an input of PIN diode 1042, and the corresponding electrical output of PIN diode 1042 is passed to oscilloscope 1048 to be used as a power reference signal 1044. The 99% output of 1:99 beam splitter 1018 is passed as an output of QA modulator 1020, which is directed to an input of emulated channel 1028.

Emulated channel 1028 transforms the input amplitude modulated quantum optical signal based on characteristics of a typical optical communications channel. Emulated channel 1028 includes variable optical attenuator (VOA) 1062 and non-variable attenuator 1064. The input to emulated channel 1028 is directed to an input of VOA 1062, and an output of VOA 1062 is directed to an input to an input of attenuator 1064. The output of attenuator 1064 is directed as an output of emulated channel 1028, which is passed to an input of detector 1040. Together, VOA 1062 and attenuator 1064 provide optical loss that emulates a deployed fiber optics communication channel.

Detector 1040 is implemented using two pairs of photo detectors, e.g., as shown and described above in reference to FIG. 7. The input of detector 1040 receives the amplitude modulated quantum optical signal from emulated channel 1028 and directs it to 90° hybrid 1066. The output of 90° hybrid 1066 is passed to two pairs of photo detectors 1068, which may be implemented as shown and described above in refence to FIG. 7. The two pairs of photo detectors 1068 also receive a local oscillator from 1:99 beam splitter 1036 in reference beam path 1012, which serves to amplify the input by mixing it with the higher powered local oscillator. The two pairs of photo detectors 1068 produce an electrical signal representative of the information in the amplitude modulated quantum optical signal, and the electrical signal is passed to oscilloscope 1048 for analysis.

Along reference beam path 1012, beam 1010 is directed to an input of amplitude modulator 1030. Amplitude modulator 1030 also receives control signal 1024 from arbitrary wave generator 1060 and uses amplitude modulation to impress information from control signal 1024 on to the beam 1010 to produce an amplitude modulated local oscillator. The amplitude modulated local oscillator is directed to an input of polarization controller 1032 which adjusts the polarization of the modulated reference beam. The modulated and polarized reference signal is then directed to delay element 1034, such as a delay line, with a delay corresponding to the delay of the signal through the quantum optical signal path 1008. The modulated, polarized, and delayed reference signal that is output from delay element 1034 is directed to an input of 1:99 beam splitter 1036. The 99% side of the output of 1:99 beam splitter 1036 is directed to an input of PIN diode 1038, the electrical output of which is directed to oscilloscope 1048 to represent a local oscillator power monitor that provides timing information. The 1% side of the output of 1:99 beam splitter 1036 is directed to two pairs of photo detectors 1068, rejoining quantum optical signal path 1008 and reference beam path 1012.

Experimental system 1000 may be converted to a system for deployment by implementing several changes. For example, system 1000 may be joined with, and used to detect attacks on, a classical optical communication system. Such a classical optical communication system may also encode in a classical optical signal information used to determine a loss of correlation, such as information carried in the quantum optical signal or information use to obtain the information carried in the quantum optical signal, as described in detail above in reference to FIG. 1. As another example, oscilloscope 1048 may be replaced by dedicated logic circuitry for determining whether an output from detector 1040, together with information regarding the sent quantum optical signal, represent a loss of correlation that indicates an attack. As another example, tolerances may be tightened such that trigger signal 1046 and the local oscillator power monitor produced by PIN diode 1038 are omitted.

Figure 11:
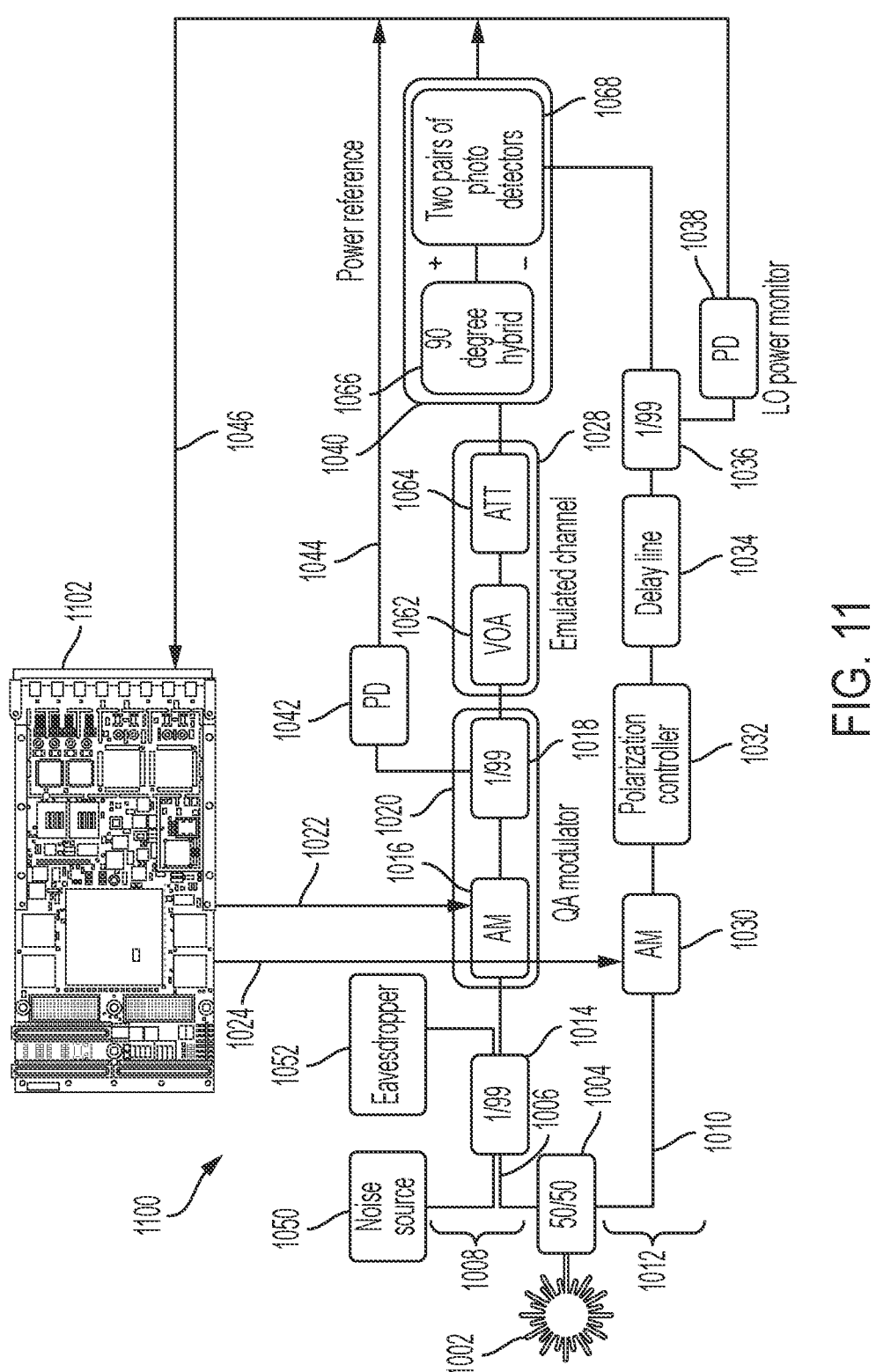
FIG. 11 is a schematic diagram of a second experimental system for detecting an attack on an optical communication channel according to various examples.

FIG. 11 is a schematic diagram of a second experimental system 1100 for detecting an attack on an optical communication channel according to various examples. System 1100 is identical to system 1000, except that it uses a card 1102 to control amplitude modulators 1016, 1030 and to analyze whether an attack has occurred. Card 1102 may be implemented as an FPGA, e.g., a VIRTEX-6 provided by XILINX corporation of San Jose, California, USA. Card 1102 may include one or more analog-to-digital converters (ADC) and/or digital-to-analog converters (DAC). One or more DACs of card 1102 may be used to control the modulation of amplitude modulators 1016, 1030 on the side of the simulated sender. For example, the gain of one such DAC may be set to 0.18 and its offset to 1500, and the gain of the other DAC may be set to 0.35 and its offset to 2000, according to an experimental usage of system 1100. One or more ADCs of card 1102 may be used to record and analyze the data detected by the simulated receiver.

Experimental system 1100 may be converted to a system for deployment by implementing several changes. For example, system 1100 may be joined with, and used to detect attacks on, a classical optical communication system. Such a classical optical communication system may also encode in a classical optical signal information used to determine a loss of correlation, such as information carried in the quantum optical signal or information used to obtain the information carried in the quantum optical signal, as described in detail above in reference to FIG. 1. As another example, card 1102 may be replaced by dedicated logic circuitry for determining whether an output from detector 1040, together with information regarding the sent quantum optical signal, represent a loss of correlation that indicates an attack. As another example, tolerances may be tightened such that the power reference signal 1044 produced by PID diode 1042 and the local oscillator power monitor produced by PIN diode 1038 are omitted.

Figure 12:
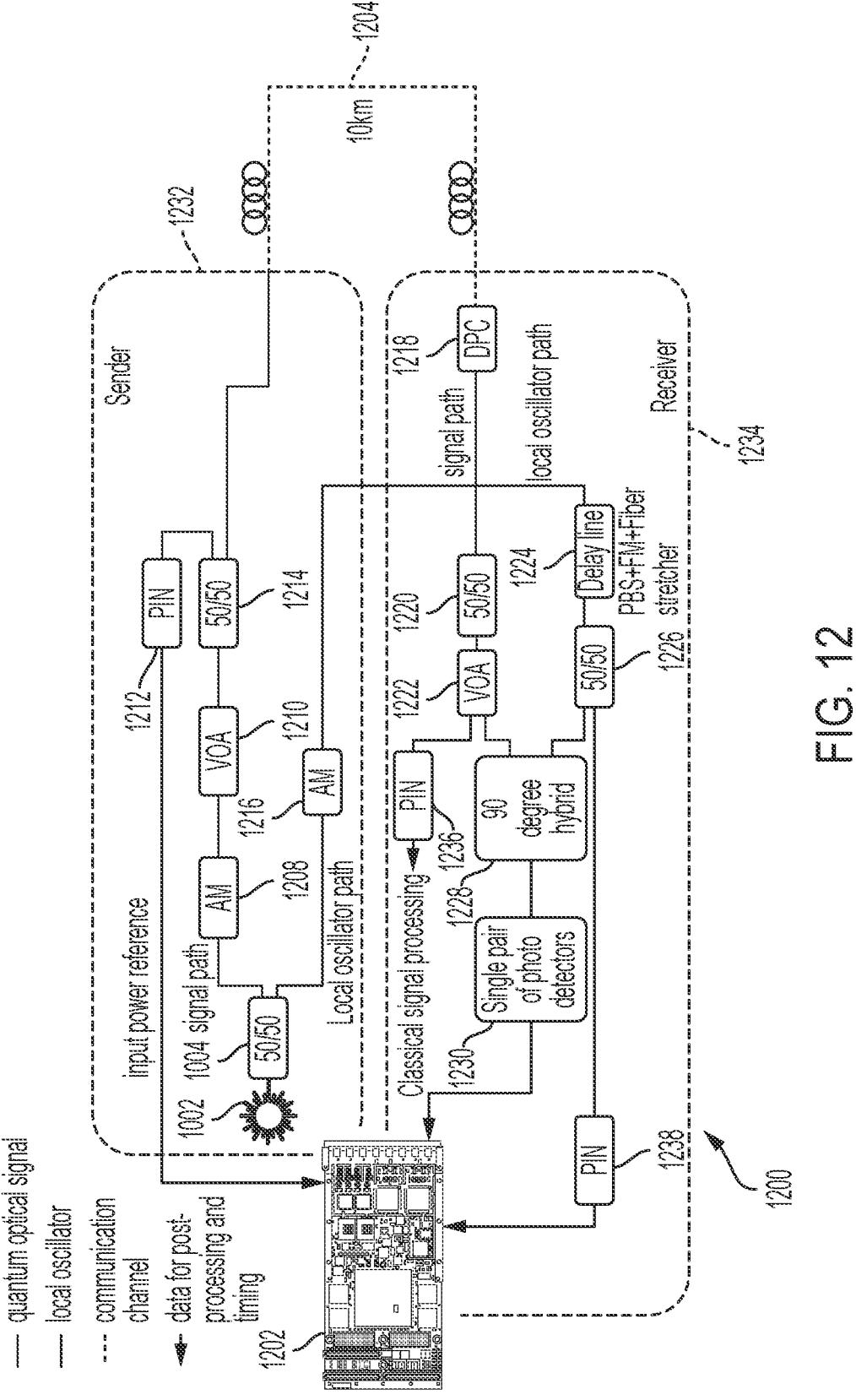
FIG. 12 is a schematic diagram of a third experimental system for detecting an attack on an optical communication channel according to various examples.

FIG. 12 is a schematic diagram of a third experimental system 1200 for detecting an attack on an optical communication channel according to various examples. System 1200 includes simulated sender 1232, simulated receiver 1234, and communication channel 1204. In operation, the simulated sender 1232 and the simulated receiver 1234 were co-located, with the communication channel 1204 forming a 10 kilometer long fiber optics loop that started and ended in the same room.

System 1200 is similar to system 1100 in that is utilizes a card 1202 to perform post processing and to control amplitude modulation of the quantum optical signal path and of the local oscillator. Card 1202 may be implemented as shown and described above in reference to card 1102 of FIG. 11.

Sender 1232 includes laser 1002 and 50:50 beam splitter 1004, which are as described above in reference to FIG. 10. One path from 50:50 beam splitter is used for the quantum optical signal, the other path from 50:50 beam splitter is used for a local oscillator. The quantum optical signal path is directed to amplitude modulator 1208 and then on to variable optical attenuator 1210. Amplitude modulator 1208 generates pulses with two amplitude levels, and variable optical attenuator attenuates the optical signal, resulting in the difference between the two amplitudes being at the quantum level. The output of variable optical attenuator is directed to an input of 50:50 beam splitter 1214. A first output from 50:50 beam splitter 1214 is passed to PIN diode 1212, which generates an electrical signal corresponding to the input optical signal that is passed as an input power reference to card 1202. A second output from 50:50 beam splitter is coupled to, and passes the quantum optical signal to, communication channel 1204. The local oscillator path from 50:50 beam splitter 1004 is coupled to an input of amplitude modulator 1216, the output of which is coupled to receiver 1234. Both amplitude modulator 1208 and amplitude modulator 1216 are controlled by control signals sent from card 1202.

Communication channel 1204 carries the quantum optical signal from sender 1232 to receiver 1234. Communication channel was implemented using 10 kilometers of optical fiber situated in real-world conditions.

Receiver 1234 receives the quantum optical signal from communication channel 1204 and passes it to an input of dynamic polarization controller 1218. Dynamic polarization controller 1218 may be used to account for polarization fluctuations due to propagation through communication channel 1204 and/or select a quadrature for measurement, e.g., in examples that use modulation such as shown and described herein in reference to FIG. 2. The output of dynamic polarization controller is coupled to an input of 50:50 beam splitter 1220. System 1200 may be configured such that sender 1232 provides a combined quantum optical signal and classical optical signal, and the classical optical signal may include information regarding the sent quantum optical signal, used for determining a loss of correlation. For such examples, a first output of 50:50 beam splitter 1220 may be directed to classical detection, e.g., classical detector 112 of FIG. 1 or classical detector 312 of FIG. 3, via PIN diode 1236. PIN diode 1236 produces an electrical signal corresponding to a classical optical signal that may be included with the quantum optical signal by sender 1232. A second output of 50:50 beam splitter 1220 is directed to an input of variable optical attenuator 1222, which reduces intensity to avoid saturating the detector. An output of variable optical attenuator 1222 is coupled to a first input of 90° hybrid 1228. Receiver 1234 receives the local oscillator from amplitude modulator 1216 and passes it to an input of delay line 1224. In this manner, delay line 1224 forms a fiber stretcher. An output of delay line 1224 is coupled to an input of 50:50 beam splitter 1226. A first output of 50:50 beam splitter 1226 may be coupled to card 1202 to provide a timing signal via PIN diode 1238. PIN diode 1238 produces an electrical signal corresponding to the local oscillator, and the electrical signal may be used for local oscillator power monitoring and clock generation. A second output of 50:50 beam splitter 1226 is coupled to a second input of 90° hybrid 1228. An output of 90° hybrid 1228 is coupled to a single pair of photo detectors 1230, which may be implemented as shown and described herein in reference to FIG. 8. Alternately, signal pair of photo detectors 1230 may be replaced by two pairs of photo detectors, e.g., as shown and described herein in reference to FIG. 7. Single pair of photo detectors 1230 provides to card 1202 an electrical signal corresponding to the quantum optical signal. Card 1202 performs post processing to detect an attack, using techniques disclosed herein, e.g., in reference to FIG. 9.

Experimental system 1200 may be converted to a system for deployment by implementing several changes. For example, system 1200 may be joined with, and used to detect attacks on, a classical optical communication system. Such a classical optical communication system may encode in the classical optical signal information used to determine a loss of correlation, such as information carried in the quantum optical signal or information used to obtain the information carried in the quantum optical signal, as described in detail above in reference to FIG. 1. Classical processing of such a classical optical signal may be used to obtain the information regarding the sent quantum optical signal, and such information may be used together with information in the quantum optical signal detected by single pair of photo detectors 1230 to detect a loss of correlation that indicates an attack, using techniques disclosed herein. As another example, card 1202 may be replaced by dedicated logic circuitry for determining whether an output from detector 1230, representing the received quantum optical signal, together with information regarding the sent quantum optical signal, reveal a loss of correlation that indicates an attack. As another example, the local oscillator may be combined with the quantum optical signal and passed via communication channel 1204, e.g., as shown and described herein in reference to FIG. 7, or via a different communication channel. As another example, card 1202 may be omitted, and a different controller may be used to control amplitude modulators 1208, 1216.

Figure 13:
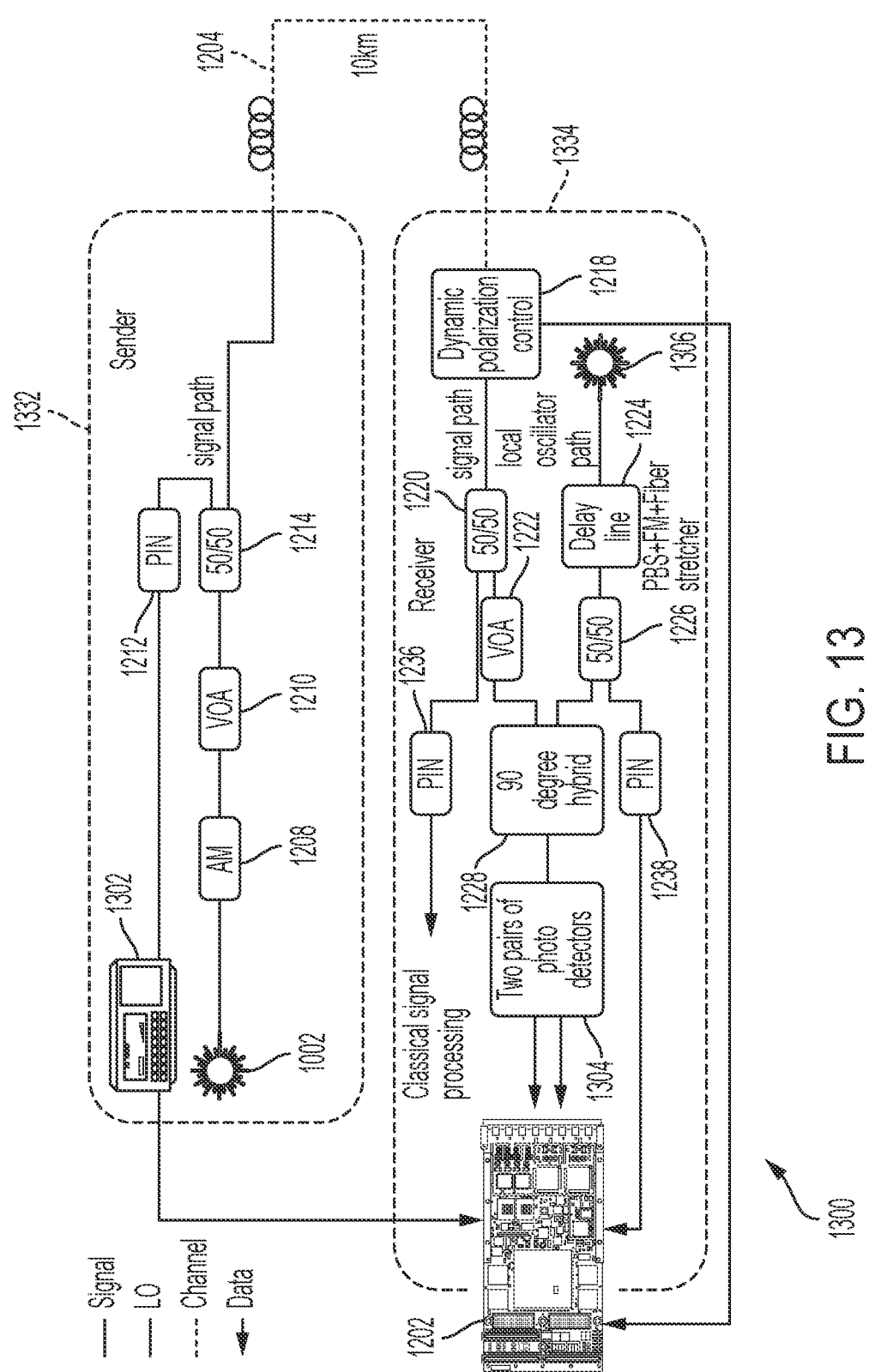
FIG. 13 is a schematic diagram of a fourth experimental system for detecting an attack on an optical communication channel according to various examples.

FIG. 13 is a schematic diagram of a fourth experimental system 1300 for detecting an attack on an optical communication channel according to various examples. System 1300 includes simulated sender 1332, simulated receiver 1334, and communication channel 1204 (the same communication channel as in system 1200 of FIG. 12). In operation, simulated sender 1332 and simulated receiver 1334 were co-located in the same room, with communication channel 1204 forming a 10 kilometer long fiber optics loop.

System 1300 is similar to system 1200 of FIG. 12, with the following elements similar or identical: laser 1002, communication channel 1204, amplitude modulator 1208, variable optical attenuator 1210, PIN diode 1212, 50:50 beam splitter 1214, dynamic polarization controller 1218, 50:50 beam splitter 1220, variable optical attenuator 1222, delay line 1224, 50:50 beam splitter 1226, and 90° optical hybrid 1228.

System 1300 differs from system 1200 of FIG. 12 in several respects. First, FIG. 13 depicts that the electrical signal from PIN diode 1212 is processed by power meter 1302 before being passed to card 1202. Second, system 1300 uses two pairs of photo detectors 1304 to detect the quantum optical signal. For examples that utilize amplitude modulation for the quantum optical signal, the influence of phase noise can be eliminated by measuring both X and P quadratures and removing the phase information, e.g., at post processing. Third, system 1300 includes a local oscillator path with laser 1306 at receiver 1334, rather that obtaining a local oscillator from sender 1332. For examples that use a local oscillator proximate to the receiver (e.g., included in, or in the same room as, the receiver's system), the receiver may utilize precise phase locking between the lasers of the transmitter and the receiver.

Figure 14:
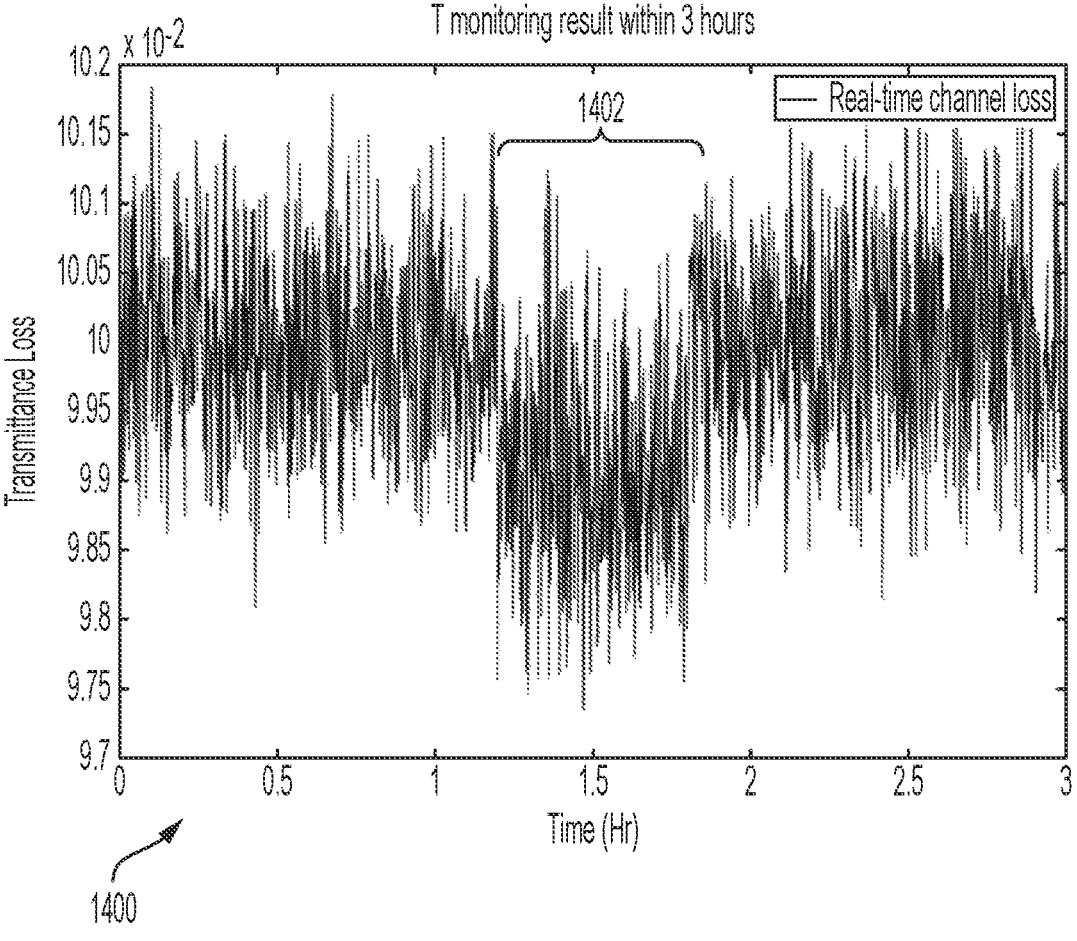
FIG. 14 is a chart depicting a detected loss of transmission due to a tapping attack on an example of a system according to FIG. 10.

FIG. 14 is a chart 1400 depicting a detected loss of transmission due to a tapping attack on an example of system 1000 of FIG. 10. Chart 1400 depicts loss of transmission versus time over a three hour timespan, where the y-axis represents transmittance loss, and the x-axis represents time. In the tapping attack, 1% of the quantum optical signal was intercepted by eavesdropper 1052 of system 1000 for about one hour. The loss of transmission during time interval 1402, detected by an example of system 1000 of FIG. 10, is a form of loss of correlation that indicates a tapping attack. In particular, the loss of transmission in time interval 1402 corresponds to the tapping attack on system 1000. As shown, there is a large amount of shot noise in the system, so much so that normal classical detection would not be able to detect a difference in signal amplitude. But detector 1040 of system 1000 is able to detect the presence of the tapping attack, as is apparent in chart 1400.

Figure 15:
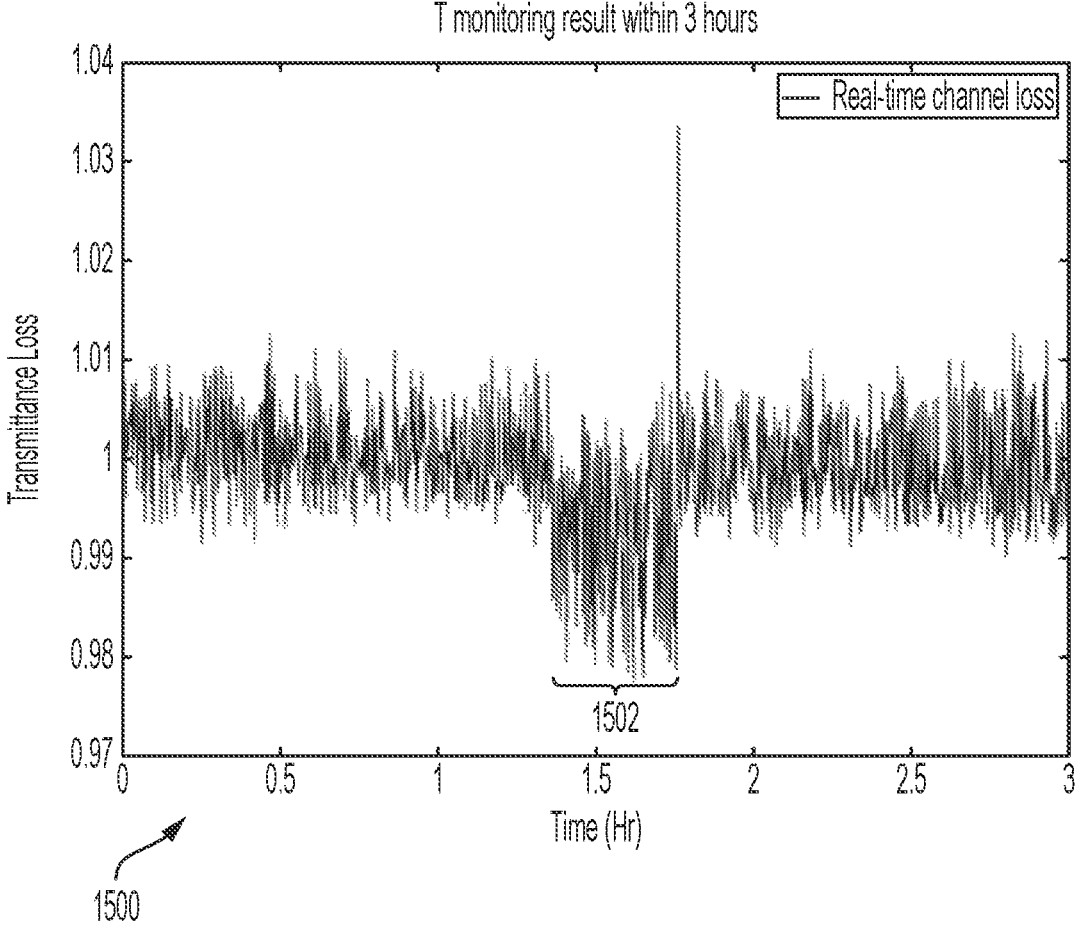
FIG. 15 is a chart depicting a detected loss of transmission due to a correlated jamming attack on an example of a system according to FIG. 10.

FIG. 15 is a chart 1500 depicting a detected loss of transmission due to a correlated jamming attack on an example of system 1000 of FIG. 10. Chart 1500 depicts loss of transmission versus time over a three hour timespan, where the y-axis represents loss of transmittance, and the x-axis represents time. FIG. 15 considers no channel loss, e.g., transmission is equal to one. In the correlated jamming attack, 1% of the quantum optical signal was intercepted by eavesdropper 1052 of system 1000 and replaced with equivalent energy in optical noise by noise source 1050 for about one hour. Thus, during the attack, there was no change in the energy of the overall quantum optical signal. The loss in time interval 1502, detected by an example of system 1000 of FIG. 10, is a form of loss of correlation that indicates a correlated jamming attack. In particular, the loss during time interval 1402 corresponds to the correlated jamming attack on system 1000. As seen in chart 1500, there is a large amount of shot noise in the system, so much so that prior art classical detection techniques would not detect a difference in signal amplitude. But detector 1040 of system 1000 is able to detect the presence of the correlated jamming attack.

Figure 16:
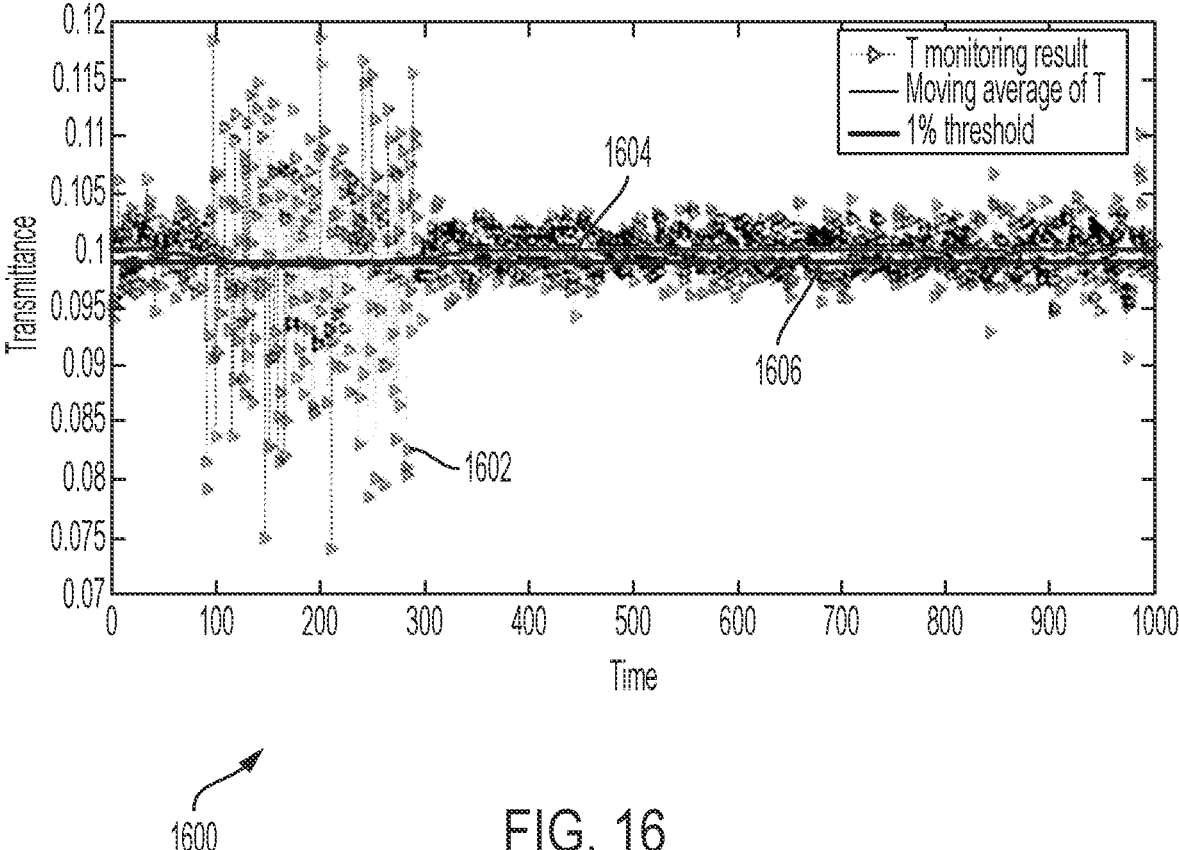
FIG. 16 is a graph depicting a detected loss of transmission due to a correlated jamming attack on a system according to FIG. 10.

FIG. 16 is a graph 1600 depicting a detected loss of transmission due to a correlated jamming attack on an example of system 1000 of FIG. 1. In graph 1600, the x-axis represents time, and the y-axis represents transmittance. The detected loss of transmission is form of a loss of correlation that indicates an attack. In the example of system 1000 used to generate graph 1600, the sender prepares a combined classical optical signal and quantum optical signal using time division multiplexing, e.g., as shown and described herein in reference to FIG. 1. The multiplexor randomly switches between sending classical optical signals and quantum optical signals over the same channel with the same timeslot durations, e.g., as shown and described in reference to FIG. 4. The classical optical signals are prepared to include random data using an on-off keying modulation scheme. The quantum optical signals are prepared using a two-state modulation scheme that randomly sent one of two quantum states, e.g., as shown and described in reference to FIGS. 2 and 8, with the signal amplitude displaced to match the classical optical signal zero level. Hence, a typical (e.g., classical optical) attacker would not be able to distinguish the quantum optical signals from the classical optical signal zero level.

For preparation of the combined optical signal, system 1000 used a single amplitude modulator, amplitude modulator 1016, to modulate both the quantum optical signal and the classical optical signal. A 50/50 splitter is inserted between attenuator 1064 and detector 1040, and half of the received signals are passed to a PIN diode for classical optical signal detection, with the other half passed to detector 1040, which measures both X and P quadratures of the signals. Although the phase quadrature does not encode information in system 1000, it is measured and used to cancel phase noise. The quantum optical signal and classical optical signal measured results are both recorded by a personal computer for post-processing. In the test represented by graph 1600, the system slot repetition rate was set as 25 MHz, with the classical data rate set at 1 Gbps.

In the correlated jamming attack, 1% of the quantum optical signal was intercepted by eavesdropper 1052, and power of light at another wavelength was injected by laser noise source 1050, to maintain the total optical power of the signal.

Graph 1600 depicts the transmittance of the quantum optical signal 1602, together with a smoothed thirty-point moving average 1604. The correlated jamming attack occurs between points 100 and 300 on the x-axis. There is an obvious drop in the transmittance of the quantum optical signal during the attack, despite the mean optical power remaining constant. The measured transmission is still decreased as the injected laser noise from noise source 1050 cannot compensate for the tapped quantum optical signal. The transmission has a much larger fluctuation during the correlated jamming attack, because the measured standard deviation of transmittance during the attack is about 0.009, e.g., 0.4 dB, while that of a safe channel is less than 0.0015, e.g., 0.04 dB. In the absence of the attack, the transmittance is 0.10, as seen in the moving average 1604 outside of the interval between 100 and 300. During the attack, e.g., inside the interval between 100 and 300, the moving average of the transmittance falls to below 0.99, or 1% less than the transmittance outside of the attack. To avoid false alarms, an alarm was triggered when the moving average, whose fluctuation is only 0.05% outside of the attack, crosses below the 1% threshold 1606 at point 110 on the x-axis. The 1% threshold 1606 indicates where the transmittance is 99% of the transmittance of 0.10 in the absence of an attack. In general, and based on the safe channel fluctuation, it is 99.99% probable that a moving average falling below the 1% threshold is caused by an attack. Experimental results confirm that sensitivity to loss is better than 0.04 dB over 50 kilometers, as compared to 0.4 dB for classical optical techniques.

Figure 17:
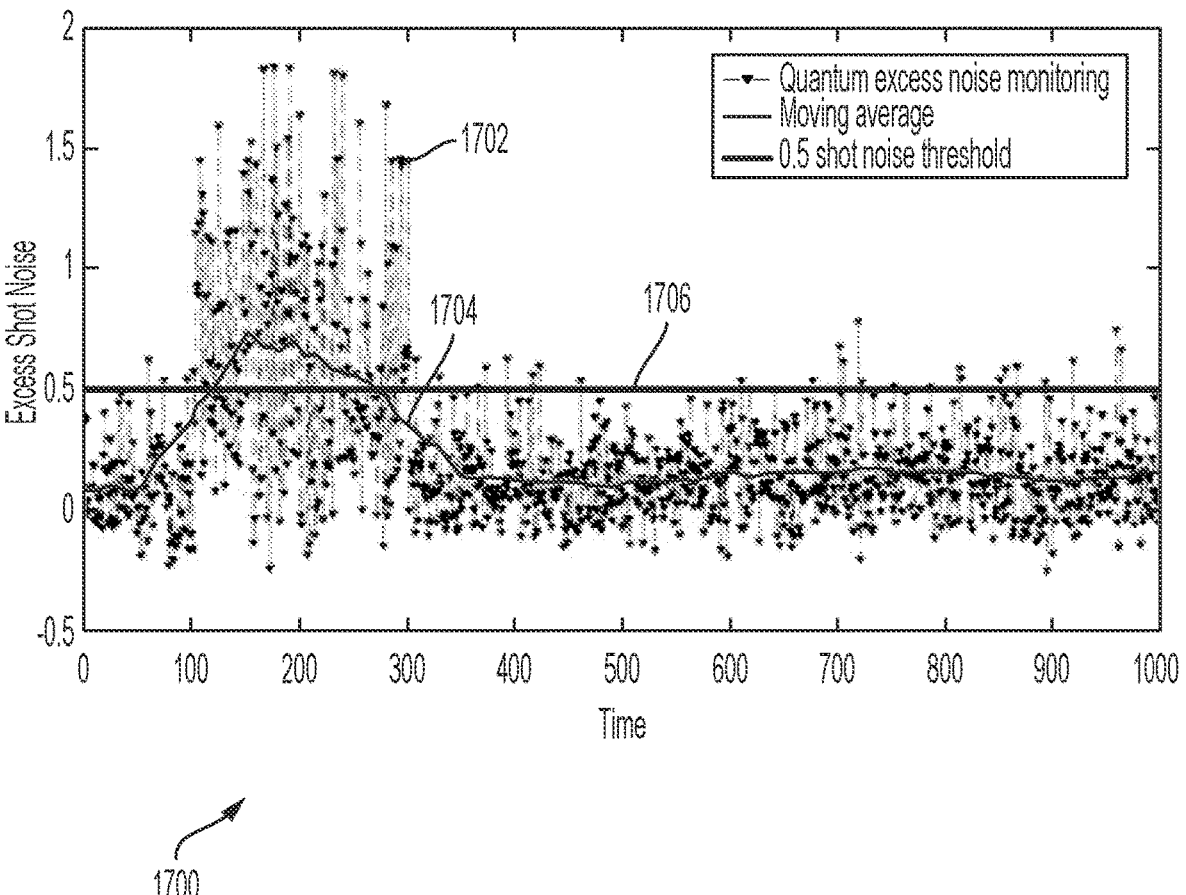
FIG. 17 is a chart depicting detected excess noise due to a correlated jamming attack on a system according to FIG. 10.

FIG. 17 is a chart 1700 depicting detected excess noise due to a correlated jamming attack on an example of system 1000 of FIG. 10. In particular, chart 1700 depicts excess noise in the quantum optical signal detected during the same correlated jamming attack on the same example of system 1000 as shown and described above in reference to FIG. 16. The quantum excess noise was calculated by removing the trusted noise from the measured quantum optical signal variance. Chart 1700 depicts measured noise 1702 in the quantum optical signal, as well as moving average 1704 of the measured noise. As shown in chart 1700, moving average 1704 increases from 0.14 shot noise units (SNU) to 0.64 SNU during the correlated jamming attack. This is equivalent to the Optical Signal-to-Noise Ratio (OSNR) decreasing by 1.5 dB. In the experiment, the alarm threshold was set at an excess noise of 0.5 SNU, which is triggered at about point 117 on the x-axis, where the moving average 1704 crosses the 0.5 shot noise threshold. In practice, due to the sporadic nature of this type of attack, such extra noise and temporal bit error rate drop is very hard to detect using classical prior art techniques. Nonetheless, the quantum optical signal excess noise is easy to detect using the example of system 1000, because it increases to nearly five times its original value.

V. MULTI-NODE IMPLEMENTATION FOR TELECOMMUNICATIONS

This section describes an implementation that includes multiple senders and receivers arranged in nodes in a communication network. In practice, a sender/receiver pair may have a limited range in which it may communicate and detect an attack. Examples according to this section extend the range of examples indefinitely by using relayed communications. Further, examples according to this section may send communications and detect attacks in either direction. Examples may be implemented using any type of sender and receiver disclosed herein.

Figure 18:
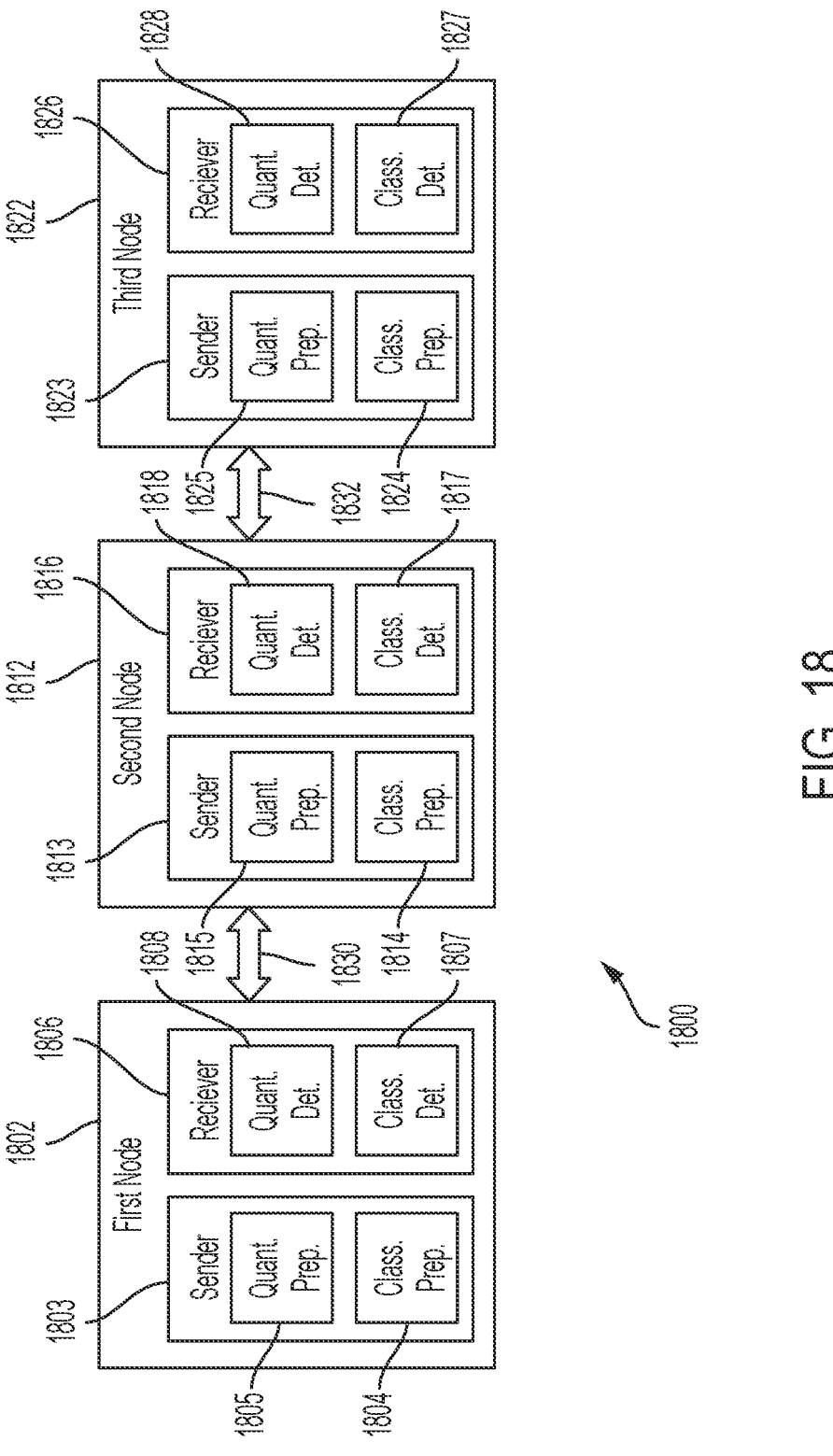
FIG. 18 is a schematic diagram of a multi-node system for detecting an attack on an optical communication channel according to various examples.

FIG. 18 is a schematic diagram of a multi-node system 1800 for detecting an attack on an optical communication channel according to various examples. System 1800 depicts three nodes, first node 1802, second node 1812, and third node 1822. Each node 1802, 1812, 1822 may have identical architecture. Each node may be in a different geographic location. Each node may be located in a building or other structure. First node 1802 is communicatively coupled to second node 1812 via optical communication channel 1830, and second node 1812 is communicatively coupled to third node 1822 via optical communication channel 1832. Optical communication channels 1830, 1832 may be implemented as fiber optics lines, e.g., in a telecommunication network. FIG. 18 depicts nodes 1802, 1812, 1822 arranged in a line, however, examples of system 1800 may have any number of nodes arranged in any communication pattern, e.g., in a communication network. Each node 1802, 1812, 1822 includes a respective sender and receiver. Each sender includes a classical preparer and a quantum preparer, and each receiver includes a classical optical detector and a quantum detector. Thus, first node 1802 includes sender 1803, which includes classical preparer 1804 and quantum preparer 1805, and receiver 1806, which includes classical detector 1807 and quantum detector 1808. Second node 1812 includes sender 1813, which includes classical preparer 1814 and quantum preparer 1815, and receiver 1816, which includes classical detector 1817 and quantum detector 1818. Third node 1822 includes sender 1823, which includes classical preparer 1824 and quantum preparer 1825, and receiver 1826, which includes classical detector 1827 and quantum detector 1828.

Each classical preparer 1804, 1814, 1824 may be implemented as any of the classical preparers disclosed herein, e.g., classical preparer 106 or 306 or their variations as disclosed herein. Each quantum preparer 1805, 1815, 1825 may be implemented as any of the quantum preparers disclosed herein, e.g., quantum preparer 104 or 304 or their variations as disclosed herein. For example, each quantum preparer 1805, 1815, 1825 may include a quantum optical modulator. Each classical detector 1807, 1817, 1827 may be implemented as any of the classical detectors disclosed herein, e.g., classical detector 112 or 312 or their variations as disclosed herein. Each quantum detector 1808, 1818, 1828 may be implemented as any of the quantum detectors disclosed herein, e.g., quantum detector 110 or 310 or their variations as disclosed herein.

In operation, each node communicates with any communicatively coupled node, in either direction, using techniques disclosed herein.

A non-limiting example of sending a communication in one direction between nodes is presented. First node 1802 may be implemented to include at least sender 150 (or sender 350); second node 1812 may be implemented to include at least receiver 152 (or receiver 352) and sender 150 (or sender 350); and third node 1822 may be implemented to include at least receiver 152 (or receiver 352). First node 1802 may send a classical optical signal, e.g., a telecommunications signal, to second node 1812, which may send the signal on to third node 1822. Except for possibly adding information for detecting a loss of correlation, the classical optical signal may be unchanged. According to this example, first node 1802 may send information in the classical optical signal portion of a combined classical and quantum optical signal to second node 1812. First node may prepare the classical optical signal portion using classical preparer 1804 and may prepare the quantum optical signal portion using quantum preparer 1805. Second node 1812 may receive the combined optical signal and direct a portion to classical detector 1817 and a portion to quantum detector 1818.

Still continuing the example, post processing for information sent from first node 1802 to second node 1812 to detect an attack in communication channel 1830 may take place in either node. In implementations where post processing occurs in second node 1812, first node 1802 may communicate information regarding the sent quantum optical signal, which second node 1812 may use to determine whether there is a loss of correlation between the quantum optical signal sent by first node 1802 and the quantum optical signal detected by second node 1822. The information regarding the sent quantum optical signal may include at least some of the information encoded in the quantum optical signal by first node 1802, as well as information used to obtain the information in the received quantum optical signal by second node 1812.

Still continuing the example, in implementations where post processing for information sent from first node 1802 to second node 1812 takes place in first node 1802, once second node 1812 receives and detects the quantum optical signal, e.g., using randomly selected bases and/or quadratures, second node 1812 may communicate the information it detected in the quantum optical signal portion, as well as information indicating how it detected the information in the quantum optical signal portion, e.g., the bases and/or quadratures that it detected for each information unit, back to first node 1802, e.g., in a classical optical signal. First node 1802 may discard incorrectly detected information, and, for the remaining correctly detected information, proceed to compare it to the information that it sent in order to determine whether there is a loss of correlation indicative of an attack.

Still continuing the example, second node 1812 may convey the classical optical signal to third node 1822, possibly adding information for detecting a loss of correlation, e.g., using classical preparer 1814. Except for the possible addition of such information, the classical optical signal sent from second node 1812 to third node 1822 may be identical to, or contain identical information in, the classical optical signal sent from first node 1802 to second node 1812. Second node 1812 may generate a new quantum optical signal unrelated to the quantum optical signal sent by first node 1802. Second node 1812 may combine the quantum optical signal with the classical optical signal and send it to third node 1822. Third node 1822 and/or second node 1812 may perform post processing to determine whether an attack occurred in communication channel 1832.

The above example outlines how first node 1802 may send information to third node 1822 by way of second node 1812 in a manner that can detect attacks. However, the techniques described in the example may be applied to any two communicatively coupled nodes for information sent in any direction, e.g., for information sent from second node 1812 to first node 1802, or for information sent in either direction between second node 1812 and third node 1822.

Note that in implementations of system 1800, classical preparers 1804, 1814, 1824 may be implemented as existing classical optical transmitters in an optical communication network, modified to perform actions disclosed herein for detecting attacks. Similarly, classical detectors 1807, 1817, 1827 may be implemented as existing classical detectors in such an optical communication network, modified to perform actions disclosed herein for detecting attacks.

VI. CONCLUSION

Figure 19:
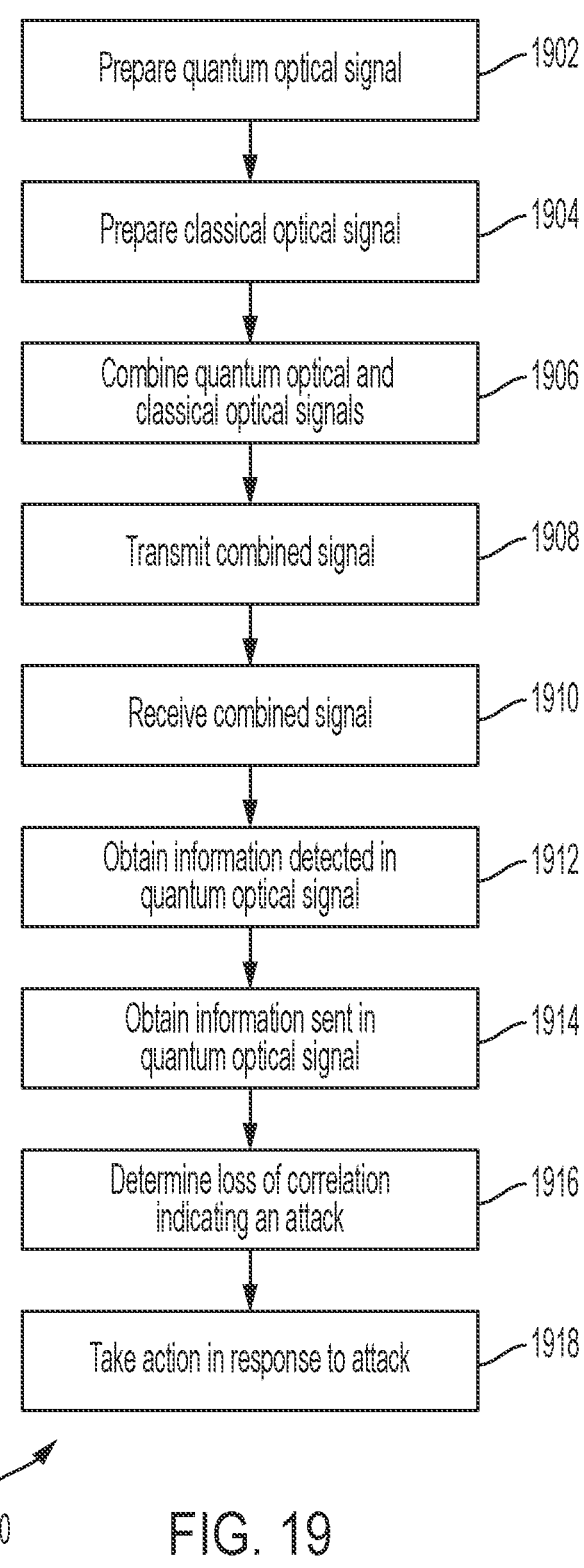
FIG. 19 is a flowchart for a method of detecting an attack on an optical communication channel according to various examples.

FIG. 19 is a flowchart for a method 1900 of detecting an attack on an optical communication channel according to various examples. Method 1900 may be implemented by any of the systems disclosed herein.

At 1902, method 1900 includes preparing a quantum optical signal. The actions of 1902 may include any of the quantum optical signal preparation actions disclosed herein, by way of non-limiting example, in reference to quantum preparer 104 or quantum preparer 304. The actions of 1902 may be performed by any sender as disclosed herein.

At 1904, method 1900 includes preparing a classical optical signal. The actions of 1904 may include any of the classical optical signal preparation actions disclosed herein, by way of non-limiting example, in reference to classical preparer 106 or classical preparer 306. The actions of 1904 may include received a pre-existing signal, either electrical or classical optical, and adding any information and/or modulating a classical optical signal as disclosed herein. The actions of 1904 may be performed by any sender as disclosed herein.

At 1906, method 1900 includes combining the quantum optical signal and the classical optical signal. Any signal combination technique as disclosed herein may be used, e.g., multiplexing as disclosed in reference to FIG. 1 or overlaying as disclosed in reference to FIGS. 3-5. The actions of 1906 may be performed by any sender as disclosed herein.

At 1908, method 1900 includes transmitting the combined optical signal. The actions of 1908 may include sending over an optical communication line, e.g., as part of a telecommunications network. The actions of 1908 may be performed by any sender as disclosed herein.

At 1910, method 1900 includes receiving the combined optical signal. The actions of 1919 my include receiving from an optical communication line, e.g., as part of a telecommunications network. The actions of 1910 may be performed by any receiver as disclosed herein.

At 1912, method 1900 includes obtaining information detected in the quantum optical signal. The actions of 1912 may include any of the quantum optical signal detection actions disclosed herein, by way of non-limiting example, in reference to quantum detector 110 or quantum detector 310. The detecting actions of 1912 may be performed by any receiver as disclosed herein. For examples in which post processing is performed by the sender, the actions of 1912 may further include sending, by the receiver, information regarding the detected quantum information, e.g., the values of such information, as well as information regarding how the detected quantum information was detected.

At 1914, method 1900 includes obtaining information sent in the quantum optical signal. For examples in which post processing is performed by the receiver, the actions of 1914 may include detecting information regarding the sent quantum optical signal, e.g., as obtained from the classical optical signal, and discarding nay incorrectly detected information. For examples in which post processing is performed by the sender, the actions of this block may include retrieving such information from memory or storage.

At 1916, method 1900 includes determining a loss of correlation indicative of an attack. The loss of correlation may be between the information detected in the quantum optical signal and the information originally sent in the quantum optical signal, possibly excluding any incorrectly detected information. Any of the various forms of losses of correlation disclosed herein may be determined. Any such form may be indicative of an attack if it exceeds (or falls below, respectively) a predetermined threshold.

At 1918, method 1900 includes taking action in response to a detected attack. Any of a variety of actions may be taken, such as rerouting the communication, sending a message, or triggering an alarm.

This disclosure provides examples according to the following clauses.

Clause 1: A system for detecting an attack on an optical communication channel, the system comprising: a first beam splitter operable to split a first optical signal into a second optical signal and a third optical signal, wherein the first optical signal is obtained from the optical communication channel, and wherein the first optical signal comprises a classical optical signal and a quantum optical signal; a classical detector operable to detect the classical optical signal in the second optical signal; a second beam splitter operable to receive the third optical signal and a fourth optical signal comprising a local oscillator and produce a fifth optical signal and a sixth optical signal; a pair of photo detectors operable to receive the fifth optical signal and the sixth optical signal and generate an electrical signal; and an electronic processor configured to determine, from the electrical signal and a representation of information encoded in the quantum optical signal, an indication of an attack on the optical communication channel.

Clause 2: The system of Clause 1, further comprising a phase modulator operable to receive one of the third optical signal or the fourth optical signal.

Clause 3: The system of any of Clauses 1 or 2, wherein the quantum optical signal comprises information encoded in at least one of a phase or in an amplitude, and wherein the phase modulator selects measurement of one of a phase or an amplitude of the quantum optical signal.

Clause 4: The system of any of Clauses 1, 2, or 3, wherein the second beam splitter comprises a polarizing beam splitter.

Clause 5: The system of any of Clauses 1-4, further comprising a local oscillator proximate to the pair of photo detectors and operable to generate the fourth optical signal.

Clause 6: The system of any of Clauses 1-5, wherein the first optical signal comprises the classical optical signal time division multiplexed with the quantum optical signal.

Clause 7: The system of any of Clauses 1-6, wherein the indication of the attack comprises an average difference of distributions of multiple states encoded in the quantum optical signal above a predetermined threshold.

Clause 8: The system of any of Clauses 1-7, wherein the indication of the attack comprises a loss of transmission of the quantum optical signal.

Clause 9: The system of any of Clauses 1-8, wherein the indication of the attack comprises a presence of excess noise.

Clause 10: The system of any of Clauses 1-9, wherein the attack comprises at least one of a tapping attack, a jamming attack, a correlated jamming attack, or an interrupt-resend attack.

Clause 11: A method of detecting an attack on an optical communication channel, the method comprising: splitting a first optical signal obtained from a communication channel into a second optical signal and a third optical signal, wherein the first optical signal comprises a classical optical signal and a quantum optical signal; detecting the classical optical signal in the second optical signal; directing the third optical signal and a fourth optical signal comprising a local oscillator to a beam splitter to produce a fifth optical signal and a sixth optical signal; directing the fifth optical signal and the sixth optical signal to a pair of photo detectors to generate an electrical signal; and determining, by an electronic processor, and based on the electrical signal and a representation of information encoded in the quantum optical signal, an indication of an attack on the optical communication channel.

Clause 12: The method of Clause 11, further comprising directing one of the third optical signal or the fourth optical signal to a phase modulator.

Clause 13: The method of any of Clauses 11 or 12, wherein the quantum optical signal comprises information encoded in at least one of a phase or in an amplitude, and wherein the phase modulator selects measurement of one of a phase or an amplitude of the quantum optical signal.

Clause 14: The method of any of Clauses 11-13, wherein the beam splitter comprises a polarizing beam splitter.

Clause 15: The method of any of Clauses 11-14, wherein the local oscillator is generated proximate to the pair of photo detectors.

Clause 16: The method of any of Clauses 11-15, wherein the first optical signal comprises the classical optical signal time division multiplexed with the quantum optical signal.

Clause 17: The method of any of Clauses 11-16, wherein the indication of the attack comprises an average difference of distributions of multiple states encoded in the quantum optical signal above a predetermined threshold.

Clause 18: The method of any of Clauses 11-17, wherein the indication of the attack comprises a loss of transmission of the quantum optical signal.

Clause 19: The method of any of Clauses 11-18, wherein the indication of the attack comprises a presence of excess noise.

Clause 20: The method of any of Clauses 11-19, wherein the attack comprises at least one of a tapping attack, a jamming attack, a correlated jamming attack, or an interrupt-resend attack.

Clause 21: A system for detecting an attack on an optical communication channel, the system comprising: a beam splitter operable to split a first optical signal into a second optical signal and a third optical signal, wherein the first optical signal is obtained from the optical communication channel, and wherein the first optical signal comprises a classical optical signal and a quantum optical signal; a classical optical demodulator operable to demodulate the classical optical signal in the second optical signal; a first pair of photo detectors operable to detect a first property of the quantum optical signal in the third optical signal; a second pair of photo detectors operable to detect a second property of the quantum optical signal in the third optical signal; and an electronic processor communicatively coupled to the first pair of photo detectors and to the second pair of photo detectors and configured to detect an attack on the optical communication channel based on information encoded by at least one of the first property of the quantum optical signal or the second property of the quantum optical signal.

Clause 22: The system of Clause 21, wherein the first property comprises phase, and wherein the second property comprises amplitude.

Clause 23: The system of any of Clauses 21 or 22, wherein the first property comprises wavelength, and wherein the second property comprises amplitude.

Clause 24: The system of any of Clauses 21-23, wherein the first property comprises phase, and wherein the second property comprises wavelength.

Clause 25: The system of any of Clauses 21-24, wherein the first property comprises polarization, and wherein the second property comprises phase.

Clause 26: The system of any of Clauses 21-25, wherein the first property comprises polarization, and wherein the second property comprises amplitude.

Clause 27: The system of any of Clauses 21-26, wherein the first property comprises polarization, and wherein the second property comprises wavelength.

Clause 28: The system of any of Clauses 21-27, further comprising a polarizing beam splitter disposed in a path of the third optical signal prior to the first pair of photo detectors and the second pair of photo detectors and operable to separate the third optical signal based on polarization.

Clause 29: The system of any of Clauses 21-28, wherein the electronic processor is configured to detect the attack on the optical communication channel by detecting at least one of a loss of transmission or an excess of noise.

Clause 30: The system of any of Clauses 21-29, wherein the attack on the optical communication channel comprises at least one of a tapping attack, a jamming attack, a correlated jamming attack, or an interrupt-resend attack.

Clause 31: A method of detecting an attack on an optical communication channel, the method comprising: splitting a first optical signal obtained from the optical communication channel into a second optical signal and a third optical signal, and wherein the first optical signal comprises a classical optical signal and a quantum optical signal; detecting the classical optical signal in the second optical signal; directing a portion of the third optical signal and a portion of a fourth optical signal comprising a local oscillator to a first pair of photo detectors operable to detect a first property of the quantum optical signal; directing a portion of the third optical signal and a portion of the fourth optical signal to a second pair of photo detectors operable to detect a second property of the quantum optical signal; and determining, by an electronic processor communicatively coupled to the first pair of photo detectors and to the second pair of photo detectors, and based on a representation of information in the quantum optical signal and information detected in at least one of the first property of the quantum optical signal or the second property of the quantum optical signal, an indication of an attack on the optical communication channel.

Clause 32: The system of Clause 31, wherein the first property comprises phase, and wherein the second property comprises amplitude.

Clause 33: The system of any of Clauses 31 or 32, wherein the first property comprises wavelength, and wherein the second property comprises amplitude.

Clause 34: The system of any of Clauses 31-33, wherein the first property comprises phase, and wherein the second property comprises wavelength.

Clause 35: The system of any of Clauses 31-34, wherein the first property comprises polarization, and wherein the second property comprises phase.

Clause 36: The system of any of Clauses 31-35, wherein the first property comprises polarization, and wherein the second property comprises amplitude.

Clause 37: The system of any of Clauses 31-36, wherein the first property comprises polarization, and wherein the second property comprises wavelength.

Clause 38: The system of any of Clauses 31-37, further comprising separating the third optical signal based on polarization.

Clause 39: The system of any of Clauses 31-38, wherein the indication of the attack on the optical communication channel comprises at least one of a loss of transmission or an excess of noise.

Clause 40: The system of any of Clauses 31-39, wherein the attack on the optical communication channel comprises at least one of a tapping attack, a jamming attack, a correlated jamming attack, or an interrupt-resend attack.

Clause 41: An optical communication system operable to detect an attack, the system comprising: a first node comprising a first node optical sender, wherein the first node optical sender comprises a first node classical optical modulator and a first node quantum optical modulator; a second node comprising a second node optical sender and a second node optical receiver, wherein the second node optical sender comprises a second node classical optical modulator and a second node quantum optical modulator; and a third node comprising a third node optical receiver; wherein the first node is coupled to the second node by a first optical communication channel, wherein the second node is coupled to the third node by a second optical communication channel, wherein the second node is operable to convey information in a first classical optical signal in the first optical communication channel to a second classical optical signal in the second optical communication channel; wherein the system is operable to detect a first attack on the first optical communication channel by detecting a loss of correlation of a first quantum optical signal in the first optical communication channel; and wherein the system is operable to detect a second attack on the second optical communication channel by detecting a loss of correlation of a second quantum optical signal in the second optical communication channel.

Clause 42: The system of Clause 41, wherein the first optical communication channel comprises a first telecommunication fiber optical cable, and wherein the second optical communication channel comprises a second telecommunication fiber optical cable.

Clause 43: The system of any of Clauses 41 or 42, wherein the first node, the second node, and the third node are installed after the first telecommunication fiber optical cable and after the second telecommunication fiber optical cable.

Clause 44: The system of any of clauses 41-43, wherein the first classical optical signal comprises a first telecommunications signal, and wherein the second classical optical signal comprises a second telecommunications signal.

Clause 45: The system of any of Clauses 41-44, wherein the system is operable to detect the loss of correlation of the first quantum optical signal in the first optical communication channel at least by transmitting, from the first node to the second node, a representation of information modulated into the first quantum optical signal by the first node quantum optical modulator, and wherein the system is operable to detect the loss of correlation of the second quantum optical signal in the second optical communication channel at least by sending, from the second node to the third node, a representation of information modulated into the second quantum optical signal by the second node quantum optical modulator.

Clause 46: The system of any of Clauses 41-45, wherein the first node comprises a first node optical receiver, and wherein the third node comprises a third node optical sender.

Clause 47: The system of any of Clauses 41-46, wherein the system is operable to detect the loss of correlation of the first quantum optical signal in the first optical communication channel at least by transmitting, from the second node to the first node, a representation of information detected by the second node optical receiver, and wherein the system is operable to detect the loss of correlation of the second quantum optical signal in the second optical communication channel at least by transmitting, from the third node to the second node, a representation of information detected by the third node optical receiver.

Clause 48: The system of any of Clauses 41-47, wherein the first node, the second node, and the third node have identical architecture.

Clause 49: The system of any of Clauses 41-48, wherein the first attack comprises at least one of a tapping attack, a jamming attack, a correlated jamming attack, or an interrupt-resend attack, and wherein the second attack comprises at least one of a tapping attack, a jamming attack, a correlated jamming attack, or an interrupt-resend attack.

Clause 50: The system of any of Clauses 41-49, wherein the loss of correlation of the first quantum optical signal comprises at least one of a loss of transmission or a presence of excess noise, and wherein the loss of correlation of the second quantum optical signal comprises at least one of a loss of transmission or a presence of excess noise.

Clause 51: A method of detecting an attack on optical communication system, the method comprising: providing a first node comprising a first node optical sender, wherein the first node optical sender comprises a first node classical optical modulator and a first node quantum optical modulator; providing a second node comprising a second node optical sender and a second node optical receiver, wherein the second node optical sender comprises a second node classical optical modulator and a second node quantum optical modulator, and wherein the first node is coupled to the second node by a first optical communication channel; providing a third node comprising a third node optical receiver, wherein the second node is coupled to the third node by a second optical communication channel; conveying information in a first classical optical signal in the first optical communication channel to a second classical optical signal in the second optical communication channel; and detecting at least one of a first attack on the first optical communication channel by detecting a loss of correlation of a first quantum optical signal in the first optical communication channel, or a second attack on the second optical communication channel by detecting a loss of correlation of a second quantum optical signal in the second optical communication channel.

Clause 52: The method of Clause 51, wherein the first optical communication channel comprises a first telecommunication fiber optical cable, and wherein the second optical communication channel comprises a second telecommunication fiber optical cable.

Clause 53: The method of any of Clauses 51 or 52, wherein the providing the first node, the providing the second node, and the providing the third node occur after the first telecommunication fiber optical cable and the second telecommunication fiber optical cable are installed.

Clause 54: The method of any of Clauses 51-53, wherein the first classical optical signal comprises a first telecommunications signal, and wherein the second classical optical signal comprises a second telecommunications signal.

Clause 55: The method of any of Clauses 51-54, wherein the detecting the loss of correlation of the first quantum optical signal in the first optical communication channel comprises transmitting, from the first node to the second node, a representation of information modulated into the first quantum optical signal by the first node quantum optical modulator, and wherein the detecting the loss of correlation of the second quantum optical signal in the second optical communication channel comprises sending, from the second node to the third node, a representation of information modulated into the second quantum optical signal by the second node quantum optical modulator.

Clause 56: The method of any of Clauses 51-55, wherein the first node comprises a first node optical receiver, and wherein the third node comprises a third node optical sender.

Clause 57: The method of any of Clauses 51-56, wherein the detecting the loss of correlation of the first quantum optical signal in the first optical communication channel comprises transmitting, from the second node to the first node, a representation of information detected by the second node optical receiver, and wherein the detecting the loss of correlation of the second quantum optical signal in the second optical communication channel comprises transmitting, from the third node to the second node, a representation of information detected by the third node optical receiver.

Clause 58: The method of any of Clauses 51-57, wherein the first node, the second node, and the third node have identical architecture.

Clause 59: The method of any of Clauses 51-58, wherein the first attack comprises at least one of a tapping attack, a jamming attack, a correlated jamming attack, or an interrupt-resend attack, and wherein the second attack comprises at least one of a tapping attack, a jamming attack, a correlated jamming attack, or an interrupt-resend attack.

Clause 60: The method of any of Clauses 51-59, wherein the loss of correlation of the first quantum optical signal comprises at least one of a loss of transmission or a presence of excess noise, and wherein the loss of correlation of the second quantum optical signal comprises at least one of a loss of transmission or a presence of excess noise.

Clause 61: A method of detecting an attack on an optical communication channel, the method comprising: generating a laser beam, by a sender; directing the laser beam to a first optical modulator to obtain a first modulated laser beam, wherein the first optical modulator is one of a quantum optical modulator or a classical optical modulator; directing the first modulated laser beam to a second optical modulator to produce a second modulated laser beam, wherein the second optical modulator is another of the quantum optical modulator or the classical optical modulator, and wherein the second modulated laser beam comprises a classical optical signal and a quantum optical signal; sending the second modulated laser beam to a receiver through an optical communication channel; detecting an attack on the classical optical signal in the optical communication channel based on detecting a loss of correlation of the quantum optical signal; and providing an indication of the attack.

Clause 62: The method of clause 61, wherein the first optical modulator is a quantum optical modulator, and wherein the second optical modulator is a classical optical modulator.

Clause 63: The method of any of Clauses 61 or 62, wherein the quantum optical signal overlaps the classical optical signal.

Clause 64: The method of any of Clauses 61-63, wherein the quantum optical signal overlaps the classical optical signal only on a portion of the classical optical signal with minimal amplitude.

Clause 65: The method of any of Clauses 61-64, wherein the loss of correlation comprises a loss of transmission of the quantum optical signal.

Clause 66: The method of any of Clauses 61-65, wherein the loss of correlation comprises a presence of excess noise.

Clause 67: The method of any of Clauses 61-66, wherein the presence of excess noise comprises at least two shot noise units.

Clause 68: The method of any of Clauses 61-67, wherein the attack comprises at least one of a tapping attack, a jamming attack, a correlated jamming attack, or an interrupt-resend attack.

Clause 69: The method of any of Clauses 61-68, wherein the detecting comprises measuring using at least two pairs of photo detectors.

Clause 70: The method of any of Clauses 61-69, wherein the detecting comprises sharing information encoded in the quantum optical signal among the sender and the receiver.

Clause 71: A system for detecting an attack on an optical communication channel, the system comprising: a laser; a first optical modulator coupled to the laser and operable to provide a first modulated laser beam, wherein the first optical modulator is one of a quantum optical modulator or a classical optical modulator; a second optical modulator coupled to the first optical modulator and operable to receive the first modulated laser beam and produce a second modulated laser beam, wherein the second optical modulator is another of the quantum optical modulator or the classical optical modulator, and wherein the second modulated laser beam comprises a classical optical signal and a quantum optical signal; and an electronic processor configured to detect a loss of correlation of the quantum optical signal indicative of an attack on the classical optical signal in an optical communication channel.

Clause 72: The system of Clause 71, wherein the first optical modulator is a quantum optical modulator, and wherein the second optical modulator is a classical optical modulator.

Clause 73: The system of any of Clauses 71 or 72, wherein the quantum optical signal overlaps the classical optical signal.

Clause 74: The system of any of Clauses 71-73, wherein the quantum optical signal overlaps the classical optical signal only on a portion of the classical optical signal with minimal amplitude.

Clause 75: The system of any of Clauses 71-74, wherein the loss of correlation comprises a loss of transmission of the quantum optical signal.

Clause 76: The system of any of Clauses 71-75, wherein the loss of correlation comprises a presence of excess noise.

Clause 77: The system of any of Clauses 71-76, wherein the presence of excess noise comprises at least two shot noise units.

Clause 78: The system of any of Clauses 71-77, wherein the attack comprises at least one of a tapping attack, a jamming attack, a correlated jamming attack, or an interrupt-resend attack.

Clause 79: The system of any of Clauses 71-78, further comprising a receiver, wherein the receiver comprises at least two pairs of photo detectors operable to detect the quantum optical signal.

Clause 80: The system of any of Clauses 71-79, wherein the electronic processor is further configured to obtain information encoded in the quantum optical signal.

In general, portions of examples disclosed herein may be combined with portions of any other examples disclosed herein. For example any disclosed modulation, detection, preparation, sending, receiving, and/or post processing techniques from any example may be used within (e.g., substituted within) any other disclosed example.

The subject disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is also to be understood that the terminology used herein is for the purpose of describing particular examples only and is not intended to be limiting.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

What is claimed is:

1. A method of detecting an attack on an optical communication channel, the method comprising:
   directing a laser beam to a classical optical modulator to obtain a first modulated laser beam comprising a classical optical signal representing first information;
   directing the first modulated laser beam to a quantum optical modulator to produce a second modulated laser beam comprising a quantum optical signal representing second information, wherein the quantum optical signal comprises the second information modulated in two quantum states, wherein the two quantum states comprise amplitude and phase;
   sending, from a sender to a receiver, and over the optical communication channel, an optical signal, wherein the optical signal comprises the classical optical signal representing the first information and the quantum optical signal representing the second information;
   detecting, by the receiver, third information from at least a portion of the quantum optical signal;
   determining, an indication of an attack on the optical communication channel based on at least the third information, wherein the determining is based on determining a loss of correlation in the third information, and wherein the loss of correlation comprises an excess difference between means of distributions of the two quantum states in the third information; and
   triggering an alarm based on the determining.

2. The method of claim 1, wherein the determining the indication of the attack further comprises determining an increase of noise.

3. The method of claim 2, wherein the determining the indication of the attack further comprises determining a loss of transmission, and wherein the determining the indication of the attack further comprises determining a loss of bit values.

4. The method of claim 1, wherein the classical optical signal is interleaved with the quantum optical signal.

5. The method of claim 1, wherein the attack comprises at least one of a tapping attack, a jamming attack, a correlated jamming attack, or an interrupt-resend attack.

6. The method of claim 1, wherein the optical communication channel comprises a distance of at least 50 km, and wherein the method has a sensitivity of less than or equal to 0.04 dB.

7. The method of claim 1, wherein the detecting comprises measuring using homodyne detection.

8. The method of claim 1, wherein the detecting comprises measuring using heterodyne detection.

9. The method of claim 1, further comprising differentiating a false alarm from an actual attack using a statistical technique, wherein the statistical technique comprises one of: change point detection, Bayesian change point detection, supervised learning, or cumulative sum (CUSUM).

10. The method of claim 1, further comprising using a Kalman filter at the receiver to predict and account for phase fluctuations in the quantum optical signal.

11. The method of claim 1, wherein the determining the loss of correlation in the third information comprises using a sliding window of values for which to compute the excess difference between means of distributions of the two quantum states in the third information.

12. A system for detecting an attack on an optical communication channel, the system comprising:

a sender comprising a laser, a hardware classical optical modulator, and a hardware quantum optical modulator, wherein the sender is configured to direct a laser beam produced by the laser to the hardware classical optical modulator to obtain a first modulated laser beam comprising a classical optical signal representing first information, wherein the sender is further configured to direct the first modulated laser beam to the hardware quantum optical modulator to produce a second modulated laser beam comprising a quantum optical signal representing second information, wherein the quantum optical signal comprises the second information modulated in two quantum states, wherein the two quantum states comprise amplitude and phase, and wherein the sender is operable to send to a receiver over the optical communication channel an optical signal comprising the classical optical signal representing the first information and the quantum optical signal representing the second information;

a receiver comprising a hardware quantum optical detector and an electronic processor, and operable to detect third information from at least a portion of the quantum optical signal;

wherein the receiver is operable to determine an indication of an attack on the optical communication channel based on at least the third information, and based on determining a loss of correlation in third information, wherein the loss of correlation comprises an excess difference between means of distributions of the two quantum states in the third information and wherein the receiver is operable to trigger an alarm that indicates the attack.

13. The system of claim 12, wherein the indication of the attack further comprises an increase of noise.

14. The system of claim 13, wherein the indication of the attack further comprises a loss of transmission, and wherein the indication of the attack further comprises a loss of bit values.

15. The system of claim 12, wherein the classical optical signal is interleaved with the quantum optical signal.

16. The system of claim 12, wherein the attack comprises at least one of a tapping attack, a jamming attack, a correlated jamming attack, or an interrupt-resend attack.

17. The system of claim 12, wherein the optical communication channel comprises a distance of at least 50 km, and wherein the sender is operable to determine the indication of the attack on the optical communication channel with a sensitivity of less than or equal to 0.04 dB.

18. The system of claim 12, wherein the receiver is operable to detect the third information from at least a portion of the quantum optical signal using homodyne detection.

19. The system of claim 12, wherein the receiver is operable to detect the third information from at least a portion of the quantum optical signal using heterodyne detection.

20. The system of claim 12, wherein the sender is operable to differentiate a false alarm from an actual attack using a statistical technique, wherein the statistical technique comprises one of: change point detection, Bayesian change point detection, supervised learning, or cumulative sum (CUSUM).

21. The system of claim 12, wherein the receiver further comprises a Kalman filter operable to predict and account for phase fluctuations in the quantum optical signal.

22. The system of claim 12, wherein the receiver is operable to determine the loss of correlation in the third information using a sliding window of values for which to compute the excess difference between means of distributions of the two quantum states in the third information.

* * * * *